United States Patent [19]
Sumioka et al.

[11] Patent Number: 5,556,649
[45] Date of Patent: Sep. 17, 1996

[54] DEVICE FOR REMOVING RUNNERS FROM MOLDED PRODUCTS

[75] Inventors: Kouichi Sumioka; Motohiro Haji; Toshiiku Suzuki; Masao Sonobe; Noriyuki Naitoh, all of Iwata, Japan

[73] Assignee: Yamaha Motor Co., Ltd., Japan

[21] Appl. No.: 113,253

[22] Filed: Aug. 30, 1993

[51] Int. Cl.[6] ................................ B29C 37/02
[52] U.S. Cl. .................. 425/215; 29/527.6; 173/114; 173/126; 173/207; 173/210; 264/161; 425/211; 425/806; 425/DIG. 51
[58] Field of Search .................... 425/211, 215, 425/216, 217, 806, DIG. 51; 264/161; 29/527.6, 527.5; 51/59 SS; 225/1, 93; 164/262, 264, 404; 173/206, 207, 135, 138, 114, 210, 211, 126

[56] References Cited

U.S. PATENT DOCUMENTS

| | | | |
|---|---|---|---|
| 1,220,100 | 3/1917 | Haeseler | 173/210 |
| 1,554,776 | 9/1925 | Bayles . | |
| 1,872,403 | 8/1932 | Cannon . | |
| 3,101,583 | 8/1963 | Ferguson | 173/126 |
| 3,172,588 | 3/1965 | Bertold et al. | 425/DIG. 51 |
| 3,431,986 | 3/1969 | Jansz | 173/207 |
| 3,565,351 | 2/1971 | Ross, Jr. | 173/210 |
| 3,595,453 | 7/1971 | Sherry | 264/23 |
| 3,608,650 | 9/1971 | Matsusaka | 173/207 |
| 3,827,186 | 8/1974 | Ehnot | 51/7 |
| 4,418,769 | 12/1983 | Vincent et al. | 173/206 |
| 4,585,152 | 4/1986 | Sager | 225/1 |
| 4,616,447 | 10/1986 | Hoas et al. | 51/59 SS |
| 4,685,602 | 8/1987 | Hama . | |
| 4,840,236 | 6/1989 | Goldman . | |
| 4,934,103 | 6/1990 | Campergue et al. | 51/59 SS |
| 5,101,599 | 4/1992 | Takabayasi et al. | 51/59 SS |
| 5,199,504 | 4/1993 | Dang | 173/206 |
| 5,265,928 | 11/1993 | Sonobe | 294/86.4 |

FOREIGN PATENT DOCUMENTS

| | | | |
|---|---|---|---|
| 3123651A1 | 12/1982 | Germany . | |
| 90-199241 | 11/1989 | Germany . | |
| 92-097354 | 8/1991 | Germany . | |
| 59-208606 | 11/1984 | Japan | 164/404 |
| 3-133561 | 6/1991 | Japan | 164/404 |
| 1526903 | 12/1989 | U.S.S.R. | 164/404 |

Primary Examiner—Jay H. Woo
Assistant Examiner—Joseph Leyson
Attorney, Agent, or Firm—Bacon & Thomas

[57] ABSTRACT

A device for removing runners from intermediate molded products includes a holding assembly for maintaining the products in a desired position, a hammer member, an assembly for vibrating the hammer member to cause repeated striking of the intermediate product so as to separate runner and product portions thereof and a control arrangement for selectively activating and deactivating the vibrating assembly. The control arrangement provides for positioning the vibrating assembly in at least one predetermined position upon deactivation thereof so as to enable the vibrating assembly to be readily restarted. The holding assembly can incorporate a robot arm for transporting and positioning the intermediate molded product for runner removal. In order to protect the robot arm from the effects of vibrational forces, the intermediate molded product is adapted to be resiliently attached to the robot arm.

12 Claims, 24 Drawing Sheets

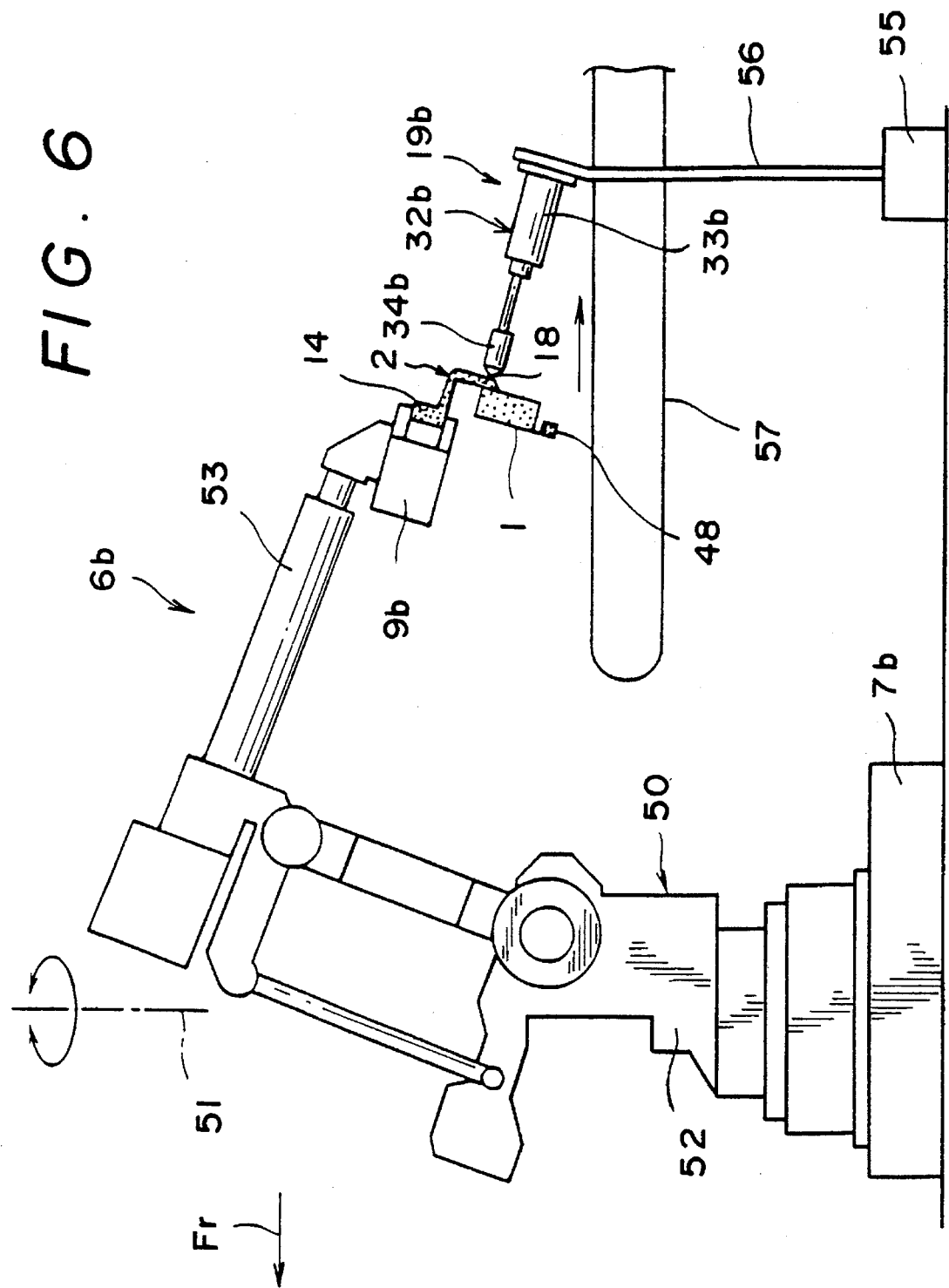

DEVICE FOR REMOVING RUNNERS FROM MOLDED PRODUCTS

BACKGROUND OF THE INVENTION

This invention is directed to a device which removes runners from a product portion of an intermediate molded product after the intermediate molded product is removed from a mold cavity after casting or injection molding.

When producing a product from casting or injection molding processes, it is common to form an intermediate molded product that consists of a product portion and a runner portion. The runner portion is formed due to the path taken by molten material flowing either to a metal mold cavity for casting or an injection molding arrangement. After the intermediate molded product is removed from an injection molding or casting cavity, the runner portion and the product portion must be separated.

Normally, a gate zone having a small cross-sectional area is formed where the runner portion connects with the product portion. Removal of the runner portion from the product portion according to the prior art is normally accomplished by fixing the product portion in a stationary manner and manually striking the runner portion, adjacent to or at the gate zone, with a hammer in order to break the gate zone. Since this runner removal method required the product portion to be fixed in place when removing the runner portion, consideration had to be given so that impact marks would not result on the product portion from the fixing structure. If the runner portion were alternatively fixed, the product portion would have to be directly struck by the hammer which could also result in impact marks.

Recently, there has been a desire to perform the task of removing the runner portion from the product portion by a machine rather than manually. Therefore, it has been proposed to use a robot arm to hold either the product portion or the runner portion of the intermediate molded product while striking the intermediate molded product with a hammer. However, the shock from the hammering in such an arrangement will be transferred to the robot arm, thereby putting an unnecessary load upon the arm and potentially resulting in costly damage. In addition, the robot arm would actually absorb some of the shock effect thereby requiring either harder blows with the hammer or a prolonged time period for separating the runner portion from the product portion.

It is also possible to incorporate a vibrator device having a hammer member at one end thereof for striking the intermediate molded product. Such a vibrator device being driven by a pneumatic cylinder or the like so that air pressure is used to cause the hammer member to strike the intermediate molded product. More specifically, the hammer member is integrally formed at the end of a piston rod and compressed air is alternatively introduced in front of and behind the piston within a cylinder so as to cause reciprocating movement of the piston rod which results in the hammer striking the intermediate molded product repeatedly.

Additionally, compressed air can be alternatively supplied to the front and back of a pneumatic cylinder using a compressor as a compressed air source by incorporating a valve which automatically switches between a piston rod advancing position and a piston rod retracting position. The structure of this known automatic valve arrangement is such that the pressure differential inside the cylinder is used to select one of the two air paths. In other words, supplying compressed air to the automatic switching valve causes the hammer member to automatically move in a reciprocating manner. To halt the hammer operation, it has been heretobefore necessary to cut off the supply of compressed air to the automatic switching valve.

Therefore, there exists a need in the art for a device to remove runner portions from product portions of an intermediate molded product that does not impart any impact marks to the product portion. In addition, there is a need to automate the transport, holding and removal of the article throughout the process of separating the runner portion from the product portion. If a robot arm is utilized for this purpose, it is necessary to protect the robot arm from unnecessary loading. Finally, there is a need in the art to provide an automatic hammering arrangement that includes a vibrator device that assures that the hammer member will be returned to a desired position following completion of the separation of the runner portion from the product such that the vibrator device can readily, automatically resume operation for removing a runner portion from a product portion of a subsequent intermediate molded product.

SUMMARY OF THE INVENTION

The object of the present invention is to provide a device for removing a runner portion from a product portion of an intermediate molded product in a simple, efficient and effective manner.

This and other objects of the present invention are accomplished by providing a device for removing runners from intermediate molded products that incorporates specific structure for holding one of the runner and product portions of the intermediate molded product in a predetermined position and a vibrating hammer assembly for striking the intermediate molded product at a desired location. According to one embodiment of the invention, the runner portion is maintained in a fixed position such that the product portion is cantilevered and the vibrating hammer assembly is selectably adjustable so as to align the hammer member for striking of the runner portion at or adjacent to a gate zone located at the connection between the runner portion and the product portion. The intermediate molded product can be held in this desired position by a holding assembly that is fixed to an upright structure or can be held by a gripping assembly carried by a robot arm. If a robot is utilized, the holding or gripping assembly is supported on and removably attached to the robot arm through a shock absorbing arrangement in order to protect the robot arm from costly damage.

The invention also incorporates a specific vibrator device which includes a fluid supply control system for directing fluid to either side of a hammering piston located within a cylinder. The fluid supply control system is connected to a release valve for connecting at least one fluid flow path to atmosphere when vibration operations are halted. By this arrangement, the hammer member carried at the end of the piston rod will be placed in either its full forward or fully retracted position when vibration operations are halted. In either of these two positions, the vibrator device can be readily restarted.

Other objects, features and advantages of the present invention will become more readily apparent from the following detailed description of preferred embodiments thereof when taken in conjunction with the accompanying drawings wherein like reference numerals refer to corresponding parts in the several views.

BRIEF DESCRIPTION OF THE DRAWINGS

FIG. 6 is a schematic side view of a runner removing device according to a third embodiment of the invention.

FIG. 7b is a view taken along line VII—VII in FIG. 7a.

FIG. 8b is a view taken along line VIII—VIII in FIG. 8a.

FIG. 9 is an enlarged, cross-sectional view of a portion of the device shown in FIG. 7a.

FIGS. 25(a)–(c) depict operational states of the vibrator device of this invention, wherein FIG. 25(a) shows a forward advancing state, FIG. 25(b) shows a rearward retraction state, and FIG. 25(c) shows a resting position of the vibrator device.

DETAILED DESCRIPTION OF THE PREFERRED EMBODIMENTS

Figure 1:
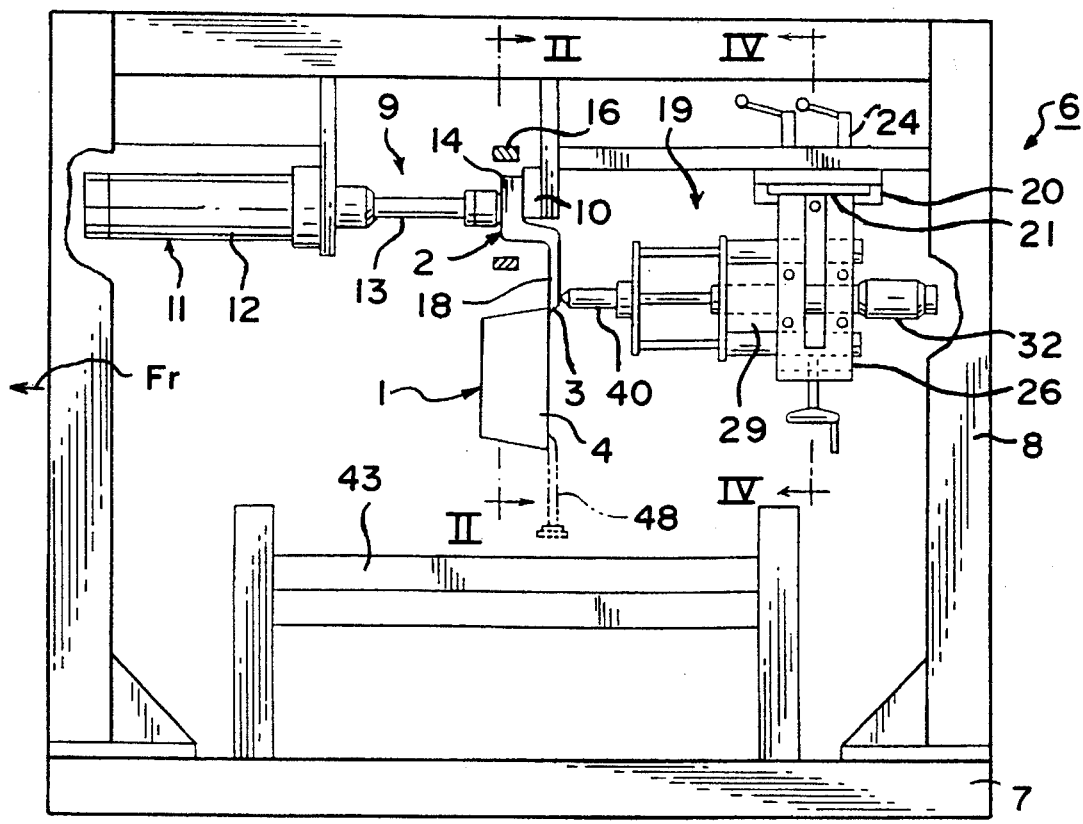
FIG. 1 is a schematic side view of a runner removing device according to a first embodiment of the invention.

Initial reference will be made to FIGS. 1–4 in describing a runner removing device according to a first embodiment of the invention. Reference number 1 refers to an intermediate molded product made of, for example, aluminum which was removed from a cavity of an injection molding machine used in a casting process. Intermediate molded product 1 consists of a runner portion 2 and a product portion 4 connected thereto. Product portion 4 is configured by the molding cavity used in the casting process and runner portion 2 is formed as an integral piece therewith due to the path that the molten material took during the casting process. Intermediate molded product 1 further includes a gate 3 having a small cross-sectional area that is formed where the runner portion 2 connects with the product portion 4.

The runner removal device of the present invention is generally indicated at 6 and functions to move the runner portion 2 from the product portion 4. The runner removal device 6 includes a base 7 and a generally U-shaped bridge 8, as viewed in FIG. 1, mounted atop base 7. To aid in describing the invention, the arrow labeled Fr in FIG. 1 points in the forward direction of the runner removal device 6.

Runner removal device 6 is equipped with a holding assembly 9 which can take various forms and functions in the embodiment of FIGS. 1–4 to grasp the runner portion 2 so that the product portion 4 will be cantilevered. The holding assembly 9 includes a jaw 10 which projects downward from the top of bridge 8. In the preferred embodiment, jaw 10 can be freely moved left and right and up and down by means of a motor-driven jack (not shown). A fluid holding cylinder 11 (either pneumatic or hydraulic) is located opposite jaw 10. Holding cylinder 11 comprises a cylinder 12 which is attached to bridge 8 so that its longitudinal axis extends in the front-to-back direction and a piston rod 13 which can extend from or retract into the rear end of the cylinder tube 12.

When piston rod 13 extends rearward, it can grasp a clamping zone 14 formed at the upper end of runner 2 by clamping zone 14 between the back end of piston rod 13 and jaw 10. This causes intermediate molded article product 1 to be secured relative to bridge 8. On the other hand, if piston rod 13 is retracted, clamping zone 14 is released.

Figure 2:
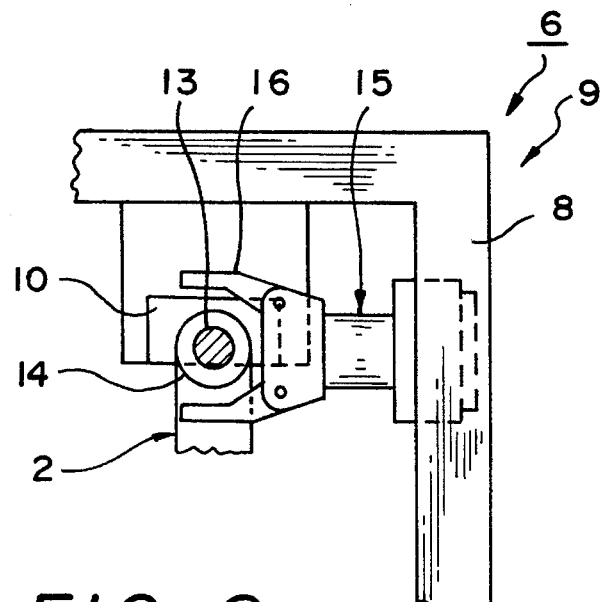
FIG. 2 is a partial view generally taken along line II—II of FIG. 1.

With the above described arrangement, the intermediate molded product 1 is conveyed from a mold cavity and its clamping zone 14 is positioned between jaw 10 and piston rod 13, preferably by a robot unit 15 (see FIG. 2). When viewed from the front, clamping zone 14 is roughly round in shape and robot 15 has a gripping unit including fingers 16 for grasping or releasing clamping zone 14.

Figure 3:
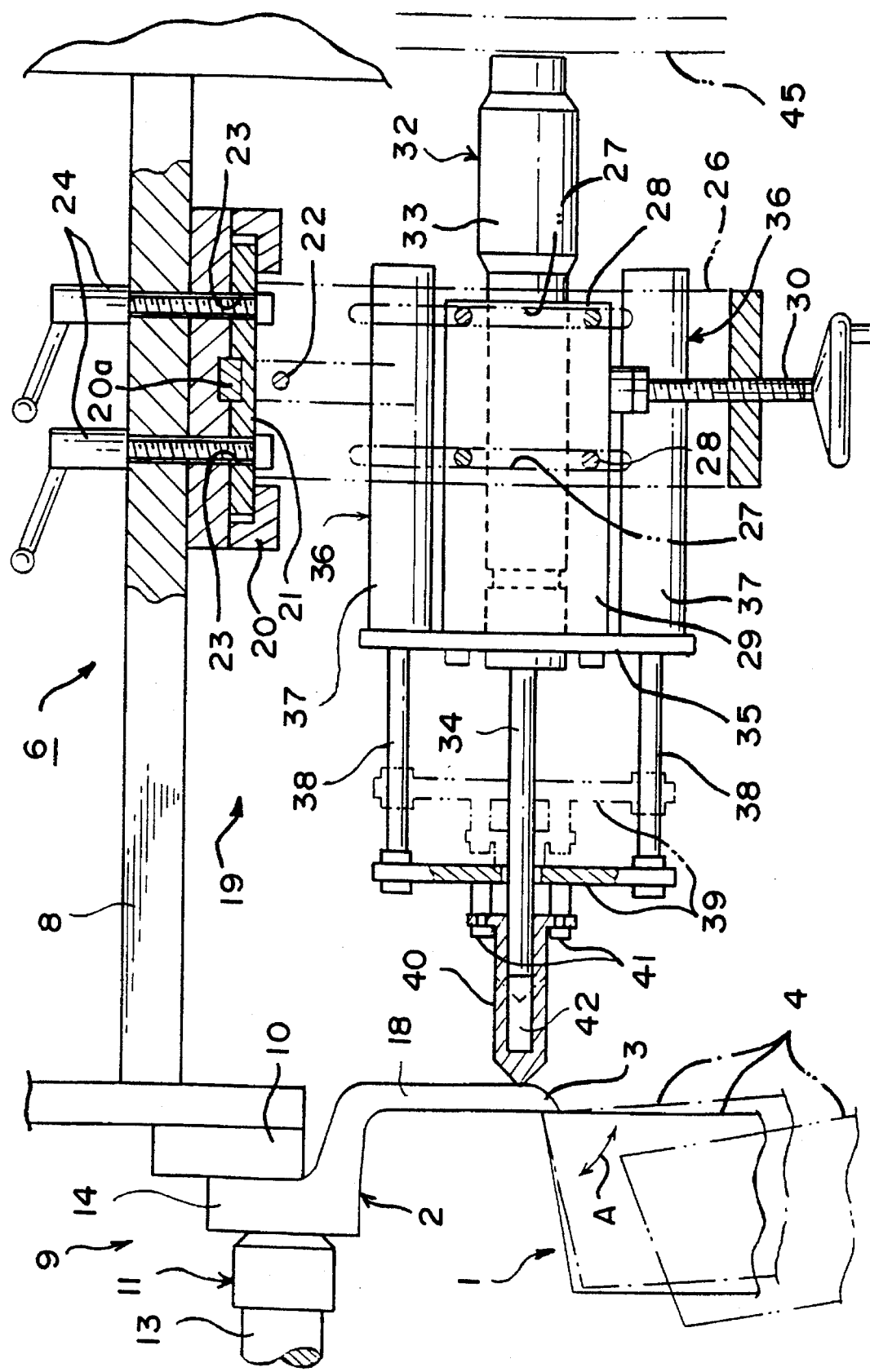
FIG. 3 is a partial, cross-sectional enlargement of a portion of the device shown in FIG. 1.
Figure 4:
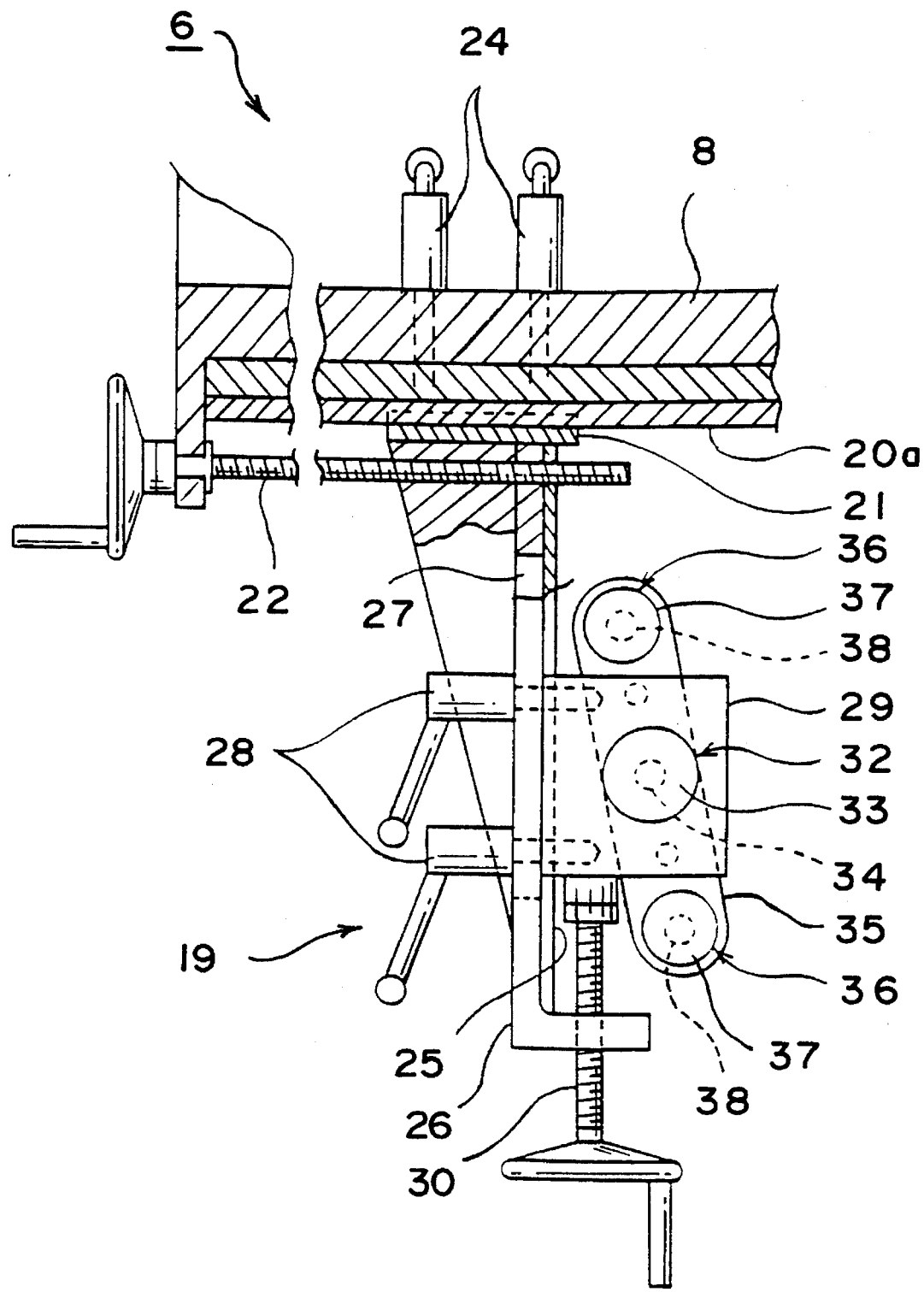
FIG. 4 is a partial, cross-sectional view taken along line IV—IV of FIG. 1.

Once holding assembly 9 is holding clamping zone 14, a hammering assembly 19 is set so that it can strike a body section 18 of runner portion 2 which lies between clamping zone 14 and gate 3. In the embodiment shown, hammering assembly 19 includes fixed rails 20 which extend horizontally in the left-right direction adjacent the top of bridge 8 and a slide guide 20a. The rails 20 and slide guide 20a slidably receive a sliding plate 21. The sliding plate 21 can be driven to a desired position left and right by a screw driver 22 which is controlled by an operating handle (not labeled). Also, a pair of slots 23 are formed at the left and right sides of sliding plate 21. Fastening elements 24 extend through slots 23 respectively, as well as through a fixed support member (not labeled) secured to bridge 8 as best seen in FIG. 3. By loosening fastening elements 24, it is possible to move sliding plate 21 to a desired position and a fix it relative to bridge 8.

A vertically extending rail 25 is connected to a bracket 26 that projects downward from sliding plate 21. Bracket 26 is formed with a pair of slots 27 on the front and back thereof that extend substantially perpendicular to bracket 26. Respective fastening members 28 pass through bracket 26 and slots 27 and are attached to a support table 29. When the fastening members 28 are loosened, support table 29 may be guided so that it is free to slide upward and downward on rail 25. In this manner, the rise and descent of support table 29 can be controlled by an operating handle of a screw jack 30. By operating the screw jack 30 and the above mentioned fastening members 28, it is possible to move the support table 29 to a desired position in two dimensions and to affix it relative to bracket 26.

Support table 29 also carries a pneumatic vibrator 32. Vibrator 32 comprises a cylinder tube 33 and a rod 34 that projects outward from cylinder tube 33. Cylinder tube 33 is attached to support table 29 so that it can move forward and backward along its longitudinal center axis. Rod 34 is adapted to vibrate in the fore and aft direction when compressed air is supplied to cylinder tube 33.

A pair of pneumatic cylinders 36 are respectively mounted above and below support table 29. Pneumatic cylinders 36 comprise cylinder tubes 37 that are fixedly secured to a support plate 35 carried by support table 29. Upper and lower piston rods 38 project from the front of cylinder tubes 37 and can be advanced or retracted. A guide plate 39 interconnects the front ends of the upper and lower piston rods 38. A cap 40 is adapted to be removably attached to connecting guide plate 39 by means of bolts 41. Cap 40 is adapted to project forward in the direction of intermediate product 1 and vibrating rod 34 is adapted to be freely inserted into and removed out of cap 40. A spacer member 42 is present between cap 40 and the end of the vibrating rod 34.

By displacing sliding plate 21 and support table 29, vibrator 32 can be moved left or right and up or down to a desired position and then, by advancing the pneumatic cylinders 36, the front end of the cap 40 can come into contact with runner body 18 of runner portion 2. Thus, when vibrator 32 is driven while cap 40 is pressing against runner body 18, vibrations from the movement of vibrating rod 34 are applied through spacer 42 to cap 40. Likewise, the vibrations of cap 40 are transmitted to runner body 18. Therefore, it should be evident that the vibrations generated by the movement of vibrating rod 34 are applied to cap 40 through the spacer 42 and indirectly to the runner body 18, thus minimizing the noise generated from the hammering as compared to an arrangement wherein the vibrating rod 34 directly strikes runner body 18. Although the striking of cap 40 may cause it to wear, cap 40 may be easily replaced due to its attachment to connecting plate 39 by means of bolts 41.

As best shown in FIG. 3, gate 3 is a zone of small cross-section compared to the majority of runner body 18 or product portion 4. Therefore, by striking adjacent to or at gate 3, product portion 4 will be caused to rotate forward and back in a direction of arrow A. In other words, gate 3 is subjected to a reciprocating load and, moreover, since runner portion 2 and the heavier product portion 4 will be caused to vibrate at different frequencies, the load from the hammering is concentrated at gate 3 such that gate 3 is easily broken by fatigue fracture. This separates product portion 4 from runner portion 2. After runner portion 2 has been removed, the supply of compressed air to cylinder tube 33 of pneumatic vibrator 32 is halted and vibrating rod 34 stops.

As best shown in FIG. 1, a chute 43 is set below hammering assembly 19 upon which product portion 4 can fall in order to be conveyed to the next processing station.

On the other hand, the remaining runner portion 2 is grasped by the fingers 16 of robot 15. Piston rod 13 of holding cylinder 11 is then retracted to release clamping zone 14 from jaw 10. Furthermore, cylinders 36 are compressed to displace cap 40 and vibrating rod 34 rearward as shown by the broken lines in FIG. 3. Then, robot 15 transports runner portion 2 to a desired location.

As stated above, vibrating rod 34 achieves vibration through the supply of compressed air to cylinder 33, however, due to the nature of this type of pneumatic vibrator 32, in order to start it when the vibrating rod 34 is at rest, it is necessary that the vibrating rod 34 be returned, if halted, to a specific position with respect to cylinder 33. In this embodiment, the contraction of pneumatic cylinders 36 causes vibrating rod 34 to be moved backward and stopped in the required position. In other words, the action of pneumatic cylinders 36 allows the unimpeded startup of vibrator 32. Thereafter, the above-described operation of runner removal device 6 can be repeated to remove runner portions 2 from successive products.

While vibrator 32 is adapted to be positioned left-right/up-down manually in the preferred embodiment as described above, it should be recognized that vibrator 32 could be positioned in various ways, for example by means of an electronically controlled robot. In this case, as indicated in phantom in FIG. 3, the reaction resulting from striking runner portion 2 can be prevented from being transmitted to the robot by mounting a back-up plate 45 to absorb vibrations from vibrator 32. It should be also recognized that product portion 4 according to the invention can take any desired shape while maintaining clamping zone 14 in a constant shape in order to enable runner removing device 6 to be used with variously molded products. In this manner, a substantial universal holding assembly 9 can be used as compared to cases wherein the product portion 4, rather than the runner portion 2, is held.

Figure 5:
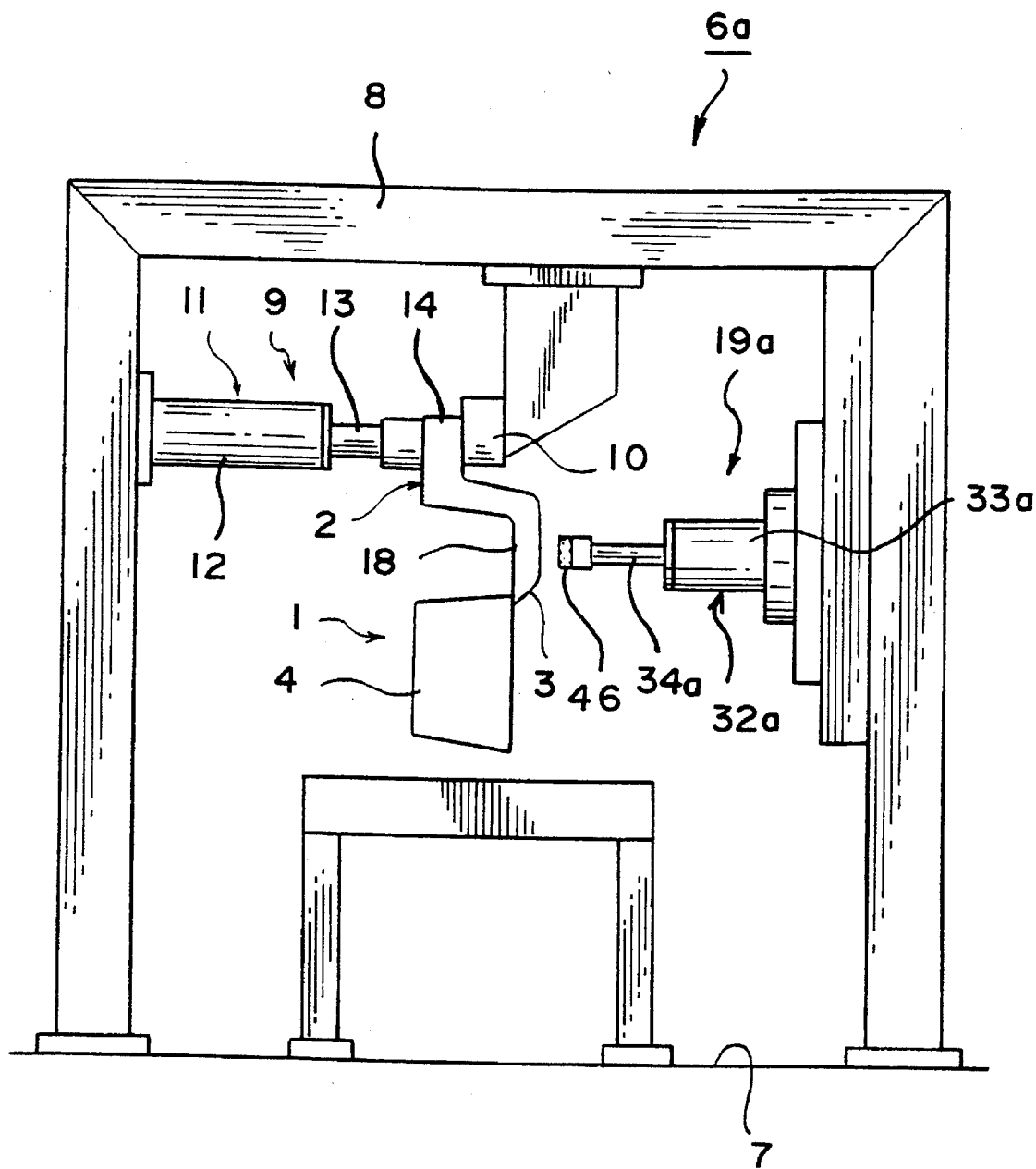
FIG. 5 is a schematic side view, similar to that of FIG. 1, depicting a runner removing device according to a second embodiment of the invention.

As outlined above, FIG. 5 depicts a runner removing device 6a according to a second embodiment of the invention. In this embodiment, vibrator 32a which forms part of hammering assembly 19a is affixed to bridge 8. In addition, cylinder tube 33a is fixed and a vibrating rod 34a directly strikes body section 18 of runner portion 2. However, a rubber or other elastomeric member 46 is affixed to the end of vibrating rod 34a in order to reduce developed noise. Since the remainder of the runner removal device 6a according to this second embodiment is the same as that described above with respect to the first embodiment, a duplicate detailed description thereof will not be repeated here.

It should be recognized that although fore and aft vibrations of the vibrating rod have been described with respect to both the first and second embodiments of the invention, the runner removal device of the present invention could also be used with up and down motions as well. In this case, since striking would be in the direction of gravity, runner portion 2 could be removed from product portion 4 more expediently. In addition, hammer assembly 19 or 19a can be made to strike runner portion 2 anywhere from gate 3 to clamping zone 14. Finally, if intermediate molded product 1 is formed with additional projections 48 due to mold airvents or the like as shown in FIG. 1, these projections 48 can be held and removed in a similar manner as runner portion 2 described above.

Reference will now be made to FIGS. 6–15 in describing preferred embodiments of robotic holding assemblies that can be utilized in connection with the runner removing device of the present invention. To aid in understanding the corresponding structure depicted in these figures to that described above with reference to FIGS. 1–5, like or similar reference numerals have been used to refer to corresponding parts.

FIG. 6 depicts a runner removing device 6b used in conjunction with a robot 50. Robot 50 comprises a base 7b that defines a vertical axis 51 about which a robot base 52 can rotate. Robot 50 further includes an arm 53 positioned at a top portion thereof. Arm 53 is free to move up and down as well as in the horizontal direction in a manner widely known in the art. Arm 53 further carries a holding assembly 9b at one end thereof. As described with respect to the embodiments of FIGS. 1–5, holding assembly 9b is adapted to grasp clamping zone 14 of intermediate molded product 1 such that hammering assembly 19b, that consists of a vibrator 32b composed of a cylinder tube 33b and a vibrating rod 34b, can engage a body section 18 of runner portion 2 in order to separate product portion 4 from runner portion 2. As shown in FIG. 6, hammering assembly 19b is fixedly secured to a top portion of a support 56 projecting from a riser 55. As shown, a conveyor belt 57 is positioned below intermediate molded product 1 for transporting product portion 4 away from runner removing device 6b.

Figure 7A:
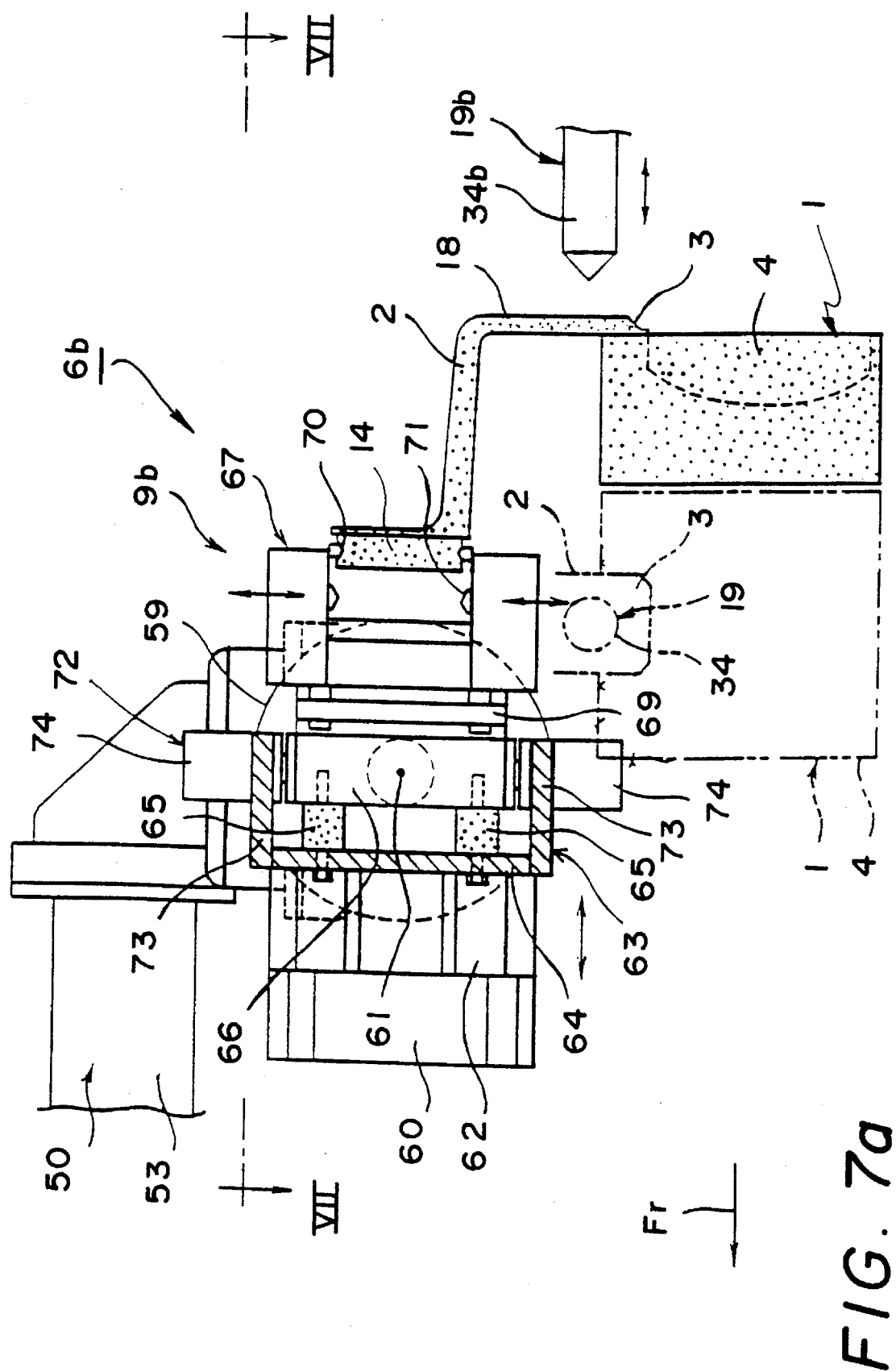
FIG. 7a is an enlarged, partial cross-sectional view of a holding assembly incorporated in the device shown in FIG. 6.
Figure 7B:
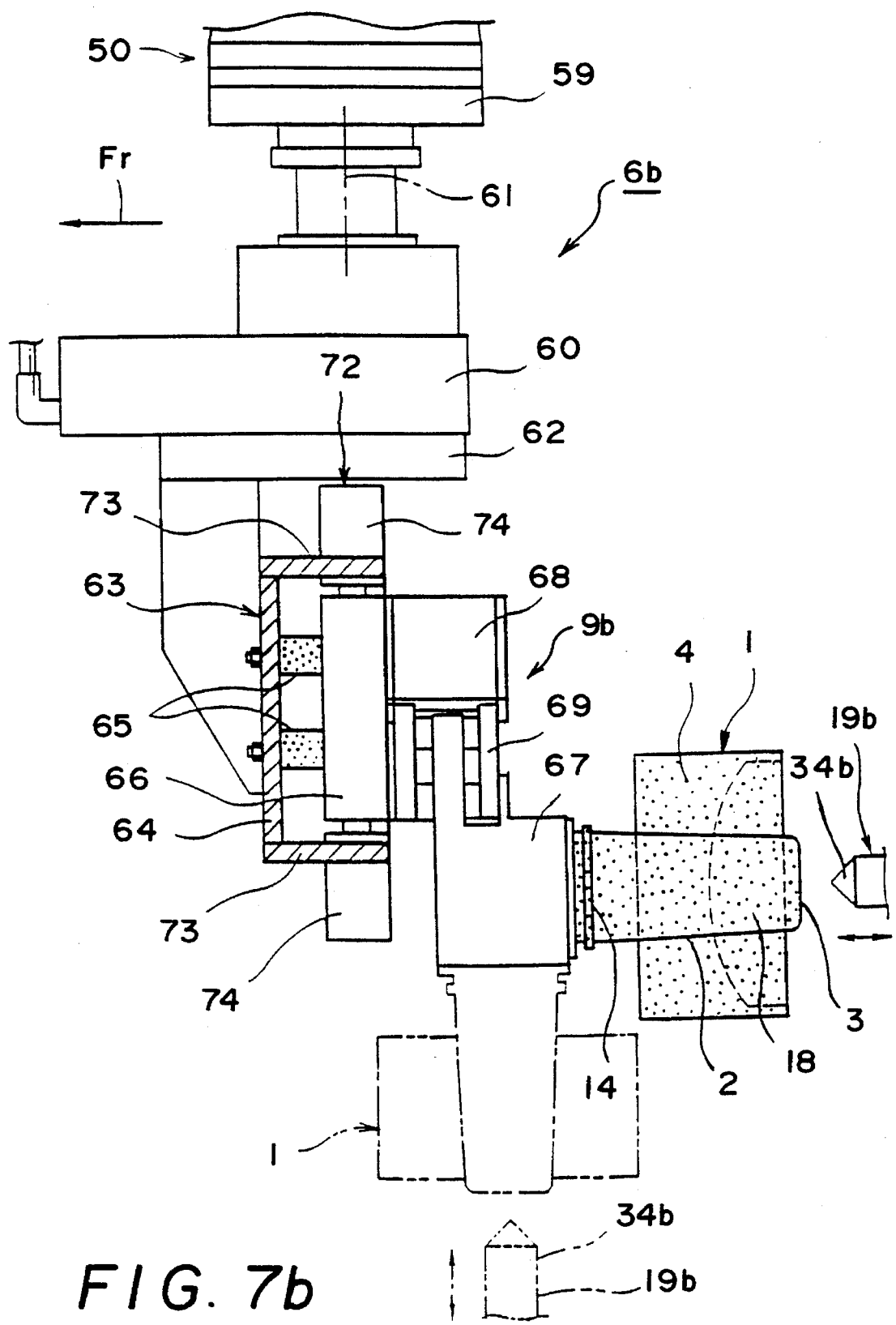
Figure 8A:
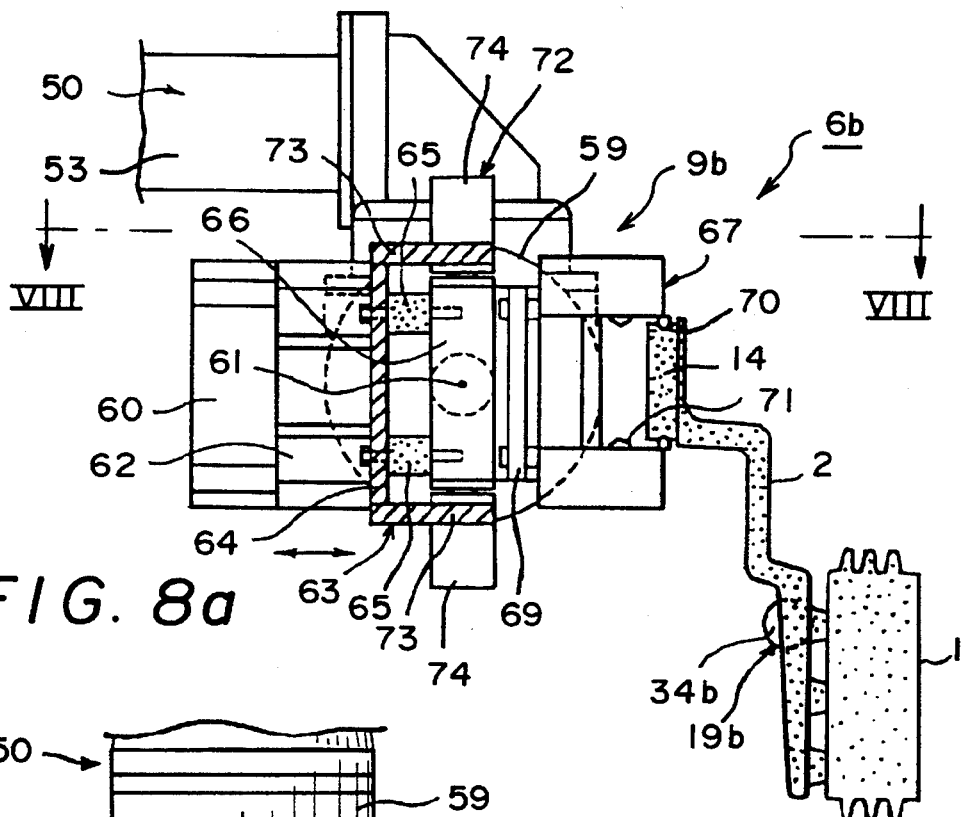
FIG. 8a shows the holding assembly of FIG. 7a supporting a different workpiece and the runner removing device operating in a different mode.
Figure 8B:
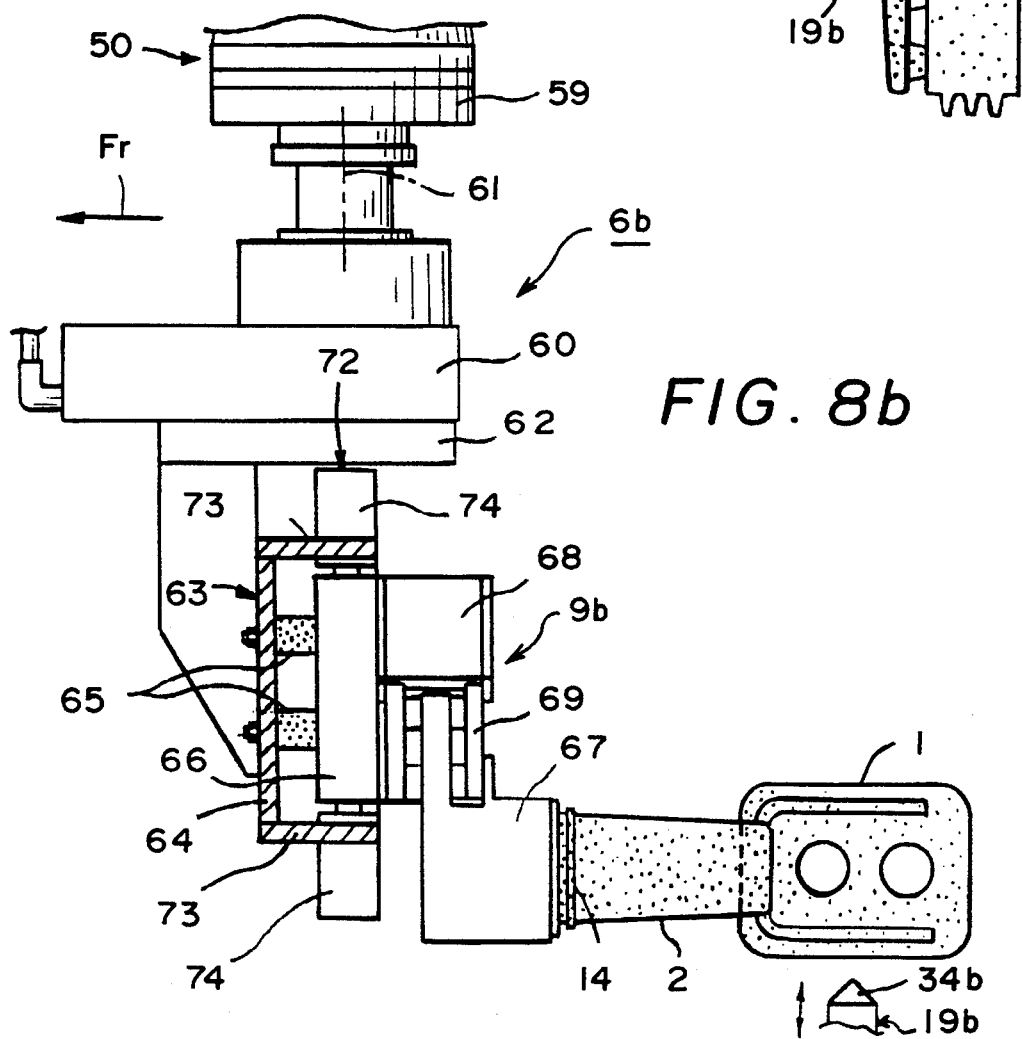
Figure 9:
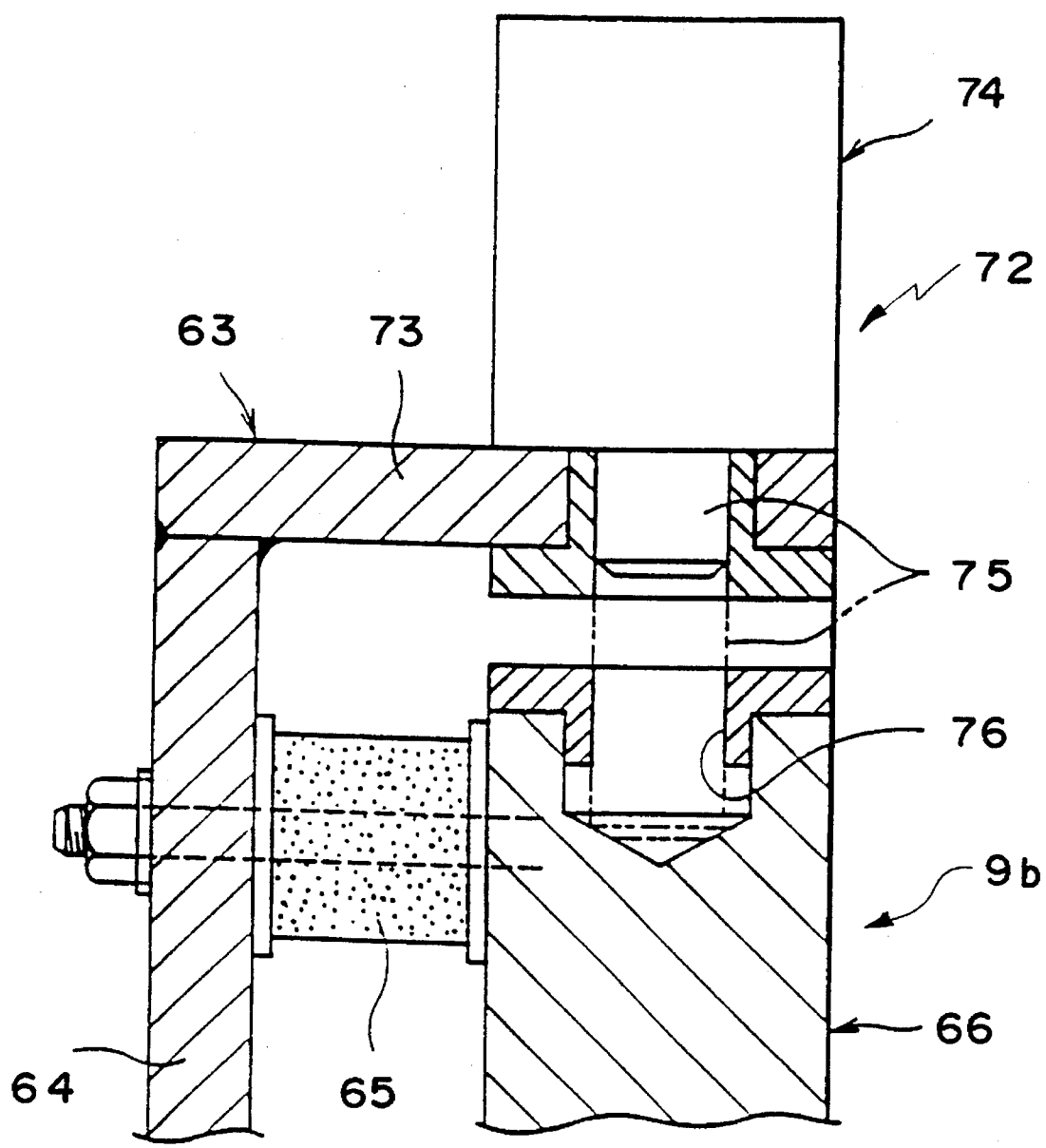

The particular structure of a preferred embodiment of holding assembly 9b will now be described with reference to FIGS. 7–9. The projecting end of arm 53 has removably attached thereto an arm tip 59. Arm tip 59 supports a slide affixing table 60 that can rotate up to one revolution around axis 61. A sliding table 62 is supported on slider fixing table 60 so that it can slide in a radial direction with respect to axis 61. Therefore, sliding table 62 can slide up to a designated position with respect to slide affixing table 60.

A box-shaped bracket 63 is attached to the sliding table 62. Box-shaped bracket 63 includes a bottom plate 64 that extends generally parallel to axis 61. Bottom plate 64 is fixedly secured by means of four rubber shock absorbing members 65 to a bracket 66. In a preferred embodiment, shock absorbing members 65 are cylindrical in shape and their axial centers extend roughly perpendicular to axis 61.

A hand chuck 67 is supported by bracket 66 and can be opened and closed by operating a chuck cylinder 68 that forms part of a toggle mechanism 69. More specifically, hand chuck 67 is equipped with outside chuck teeth 70 and inside chuck teeth 71. Outside chuck teeth 70 are adapted to grasp clamping zone 14 of runner portion 2 when hand chuck 67 is closed. On the other hand, inside chuck teeth 71 can be used to hold another element such as a sprayer for spraying mold parting agents or the like.

Box-shaped bracket 63 is further attached to bracket 66 by an attachment assembly generally indicated at 72. More particularly, box-shaped bracket 63 includes an annular outside plate 73 to which is secured four holding cylinders 74 of attachment assembly 72. Holding cylinders 74 are preferably equidistantly spaced around bracket 66. Each holding cylinder 74 has associated therewith a piston rod 75 that extends through corresponding insertion holes 76 formed in bracket 66. This particular structure is best shown in FIG. 9 wherein, if holding cylinders 74 are retracted, their corresponding piston rods 75 are withdrawn from respective insertion holes 76 so as to disengage this attachment of holding assembly 9b to box-shaped bracket 63. On the other hand, as shown by the dashed lines in this figure, when holding cylinders 74 are in their extended positions, piston rods 75 pass through insertion holes 76 and the tips of piston rods 75 come into contact against a bottom surface of a respective insertion hole 76 to thus maintain holding assembly 9b affixed to boxed-shaped bracket 63.

When runner portion 2 of intermediate molded product 1 is to be removed from product portion 4, robot 50 positions runner portion 2 opposite vibrating rod 34b of hammering assembly 19b. While robot 50 is operating, piston rod 75 of holding cylinders 74 are advanced and inserted into insertion holes 76 to secure bracket 66 to box-shaped bracket 63. As a result, during the operation of robot 50, bracket 66, hand chuck 67 and intermediate molded product 1 are supported at the end of arm tip 59 by holding cylinder 74. By this arrangement, bracket 66, hand chuck 67 and intermediate molded product 1 are firmly supported without shaking with respect to the end of arm tip 59 during operation of robot 50 so that robot 50 can actively transport and position intermediate molded product 1.

At this point, runner portion 2 of intermediate molded product 1 is positioned opposite vibrating rod 34b of hammering assembly 19b and the movement of robot 50 is stopped. Then, piston rods 75 of holding cylinders 74 are retracted to disengage this attachment between bracket 66 and box-shaped bracket 63. Thereafter, bracket 66, hand chuck 67 and intermediate molded product 1 are held on the end of arm tip 59 only by shock absorbing members 65. In this condition, the vibration of rod 34b of hammering assembly 19b upon striking gate 3 of body section 18 will not be directly transmitted to arm tip 59 as runner portion 2 is separated from product portion 4. Following separation, runner portion 2 can be dropped into a return bucket (not shown) for use in re-casting and product portion 4 is transported by conveyor 57 to the next processing station.

By the above description, it should be readily apparent that vibrations transmitted from intermediate molded product 1 to arm tip 59 are absorbed by the shock absorbing members 65 during the removal stage of operation of runner removal device 6b. In other words, the transmission of vibrations to arm tip 59 is substantially prevented. Thus, the vibrations which would have been wastefully absorbed instead have their load effectively concentrated at gate zone 3 so that runner portion 2 can be easily removed. Since the vibrations are not transmitted to arm tip 59, robot 50 is protected. In the preferred embodiment shown, shock absorbing members 65 have a longitudinal axis that is substantially parallel to the longitudinal axis of vibrating rod 34b. Therefore, shock absorbing members 65 can absorb vibrations by elastic deformation in their axial direction. Of course, it would be possible to reposition holding assembly 9b to the position shown in dotted lines in FIG. 7b or as indicated in FIGS. 8a and 8b. With these arrangements, vibrations developed during removal of runner portion 2 from product portion 4 would be effectively absorbed by shock absorbing members 65 through elastic deformation in the shear direction.

Figure 10:
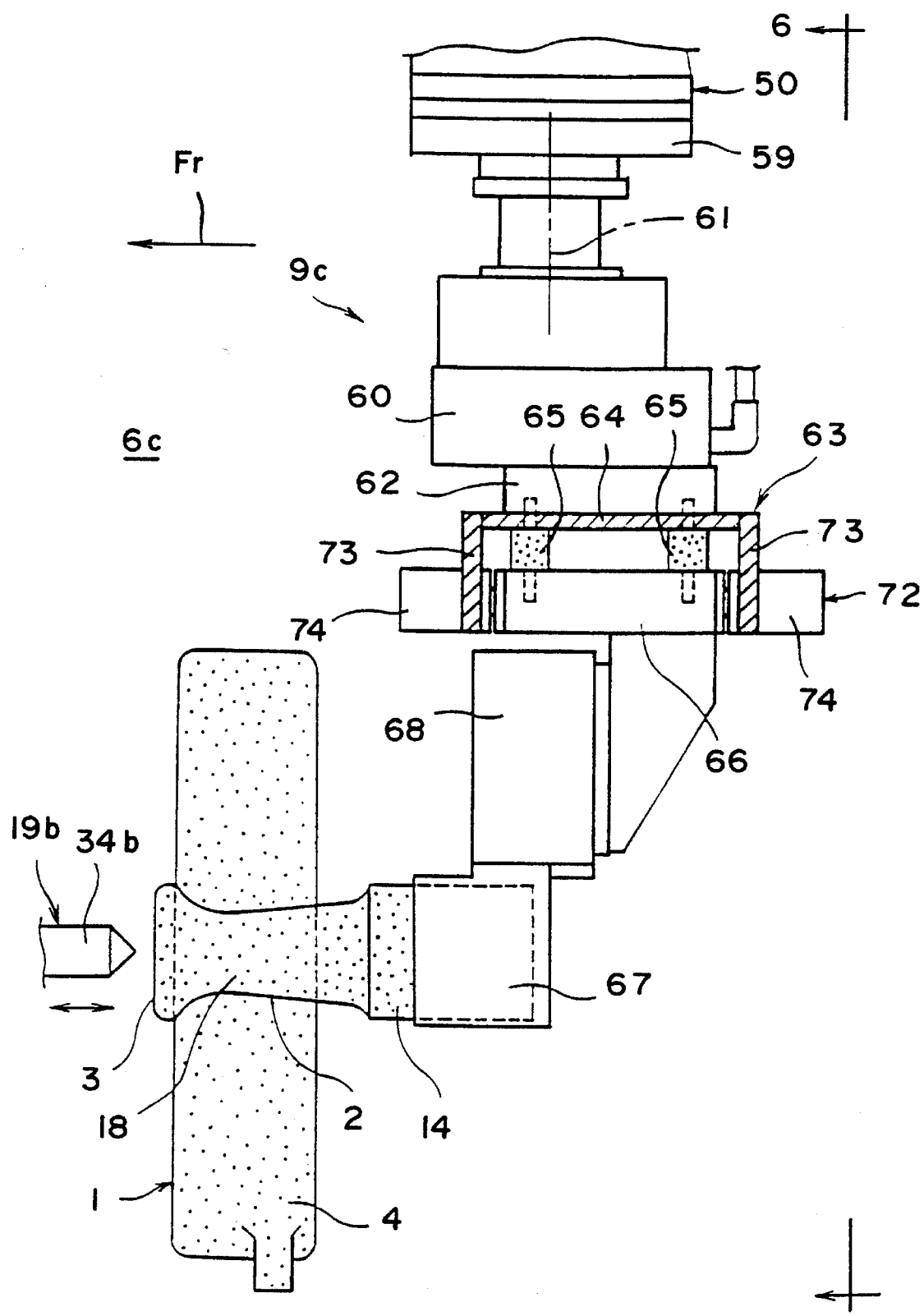
FIG. 10 is a enlarged, partial cross-sectional view, similar to that of FIG. 7b, depicting a runner removing device according to a further embodiment and a holding assembly according to a third embodiment.
Figure 11:
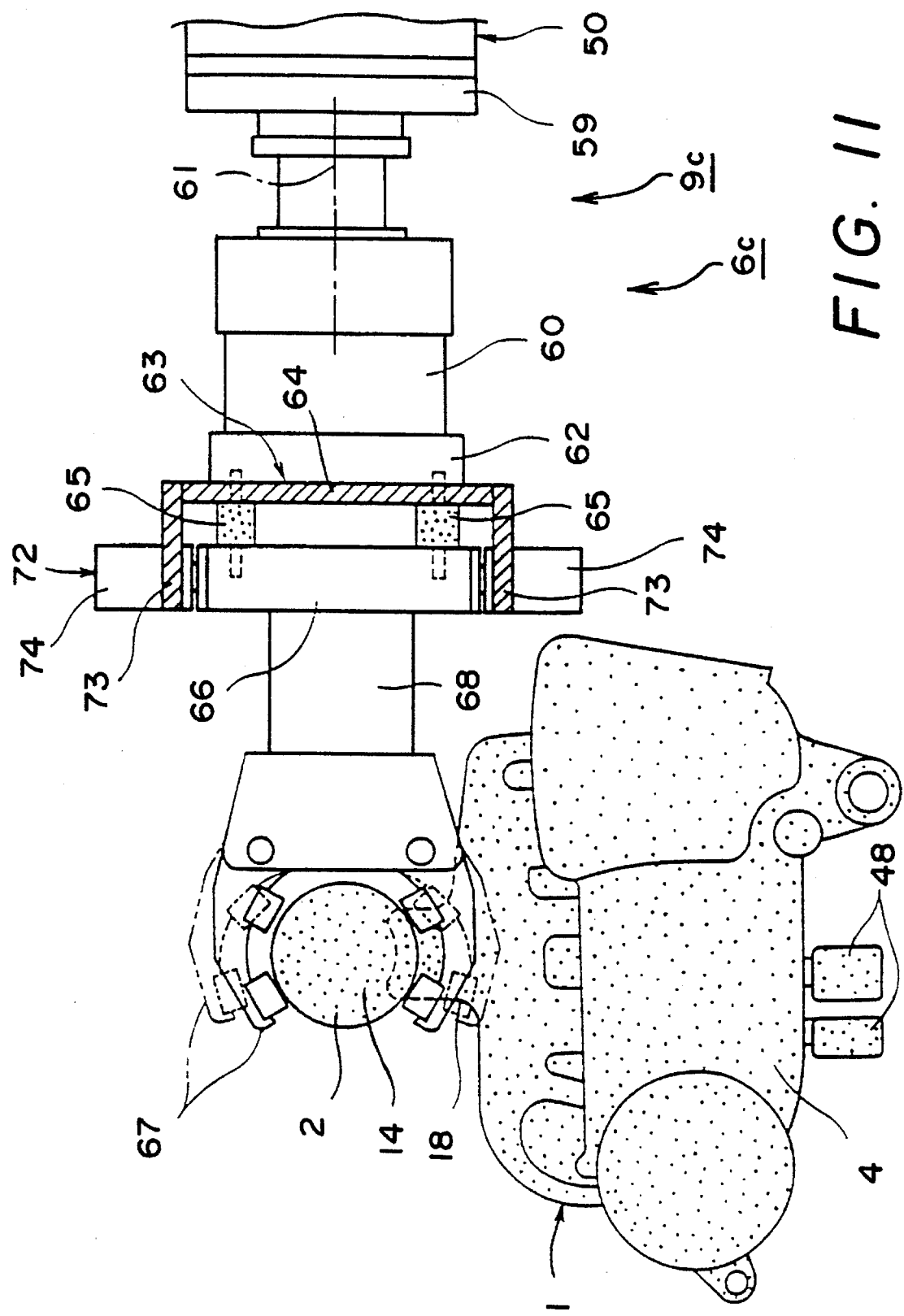
FIG. 11 is a view taken along line XI—XI in FIG. 10.

Another holding assembly embodiment will now be described with reference to FIGS. 10 and 11 wherein like reference numerals to the embodiment described above refer to corresponding parts in the various drawings. In this embodiment, bottom plate 64 of box-shaped bracket 63 extends in a direction perpendicular to the axis of arm tip 59. The axes of shock absorbing member 65 are roughly parallel to axis 61. Here, hand chuck 67 holds the clamping zone 14 of intermediate molded product 1 and strikes from vibrating rod 34b of hammering assembly 19b hit runner section 2. At this time, vibrating rod 34b is vibrating back and forth while the axes of shock absorbing members 65 extend in the left-right direction. The vibrations which would have been transmitted to the arm tip 59 are effectively absorbed by elastic deformation of the shock absorbing member 65 in the shear direction.

Figure 12:
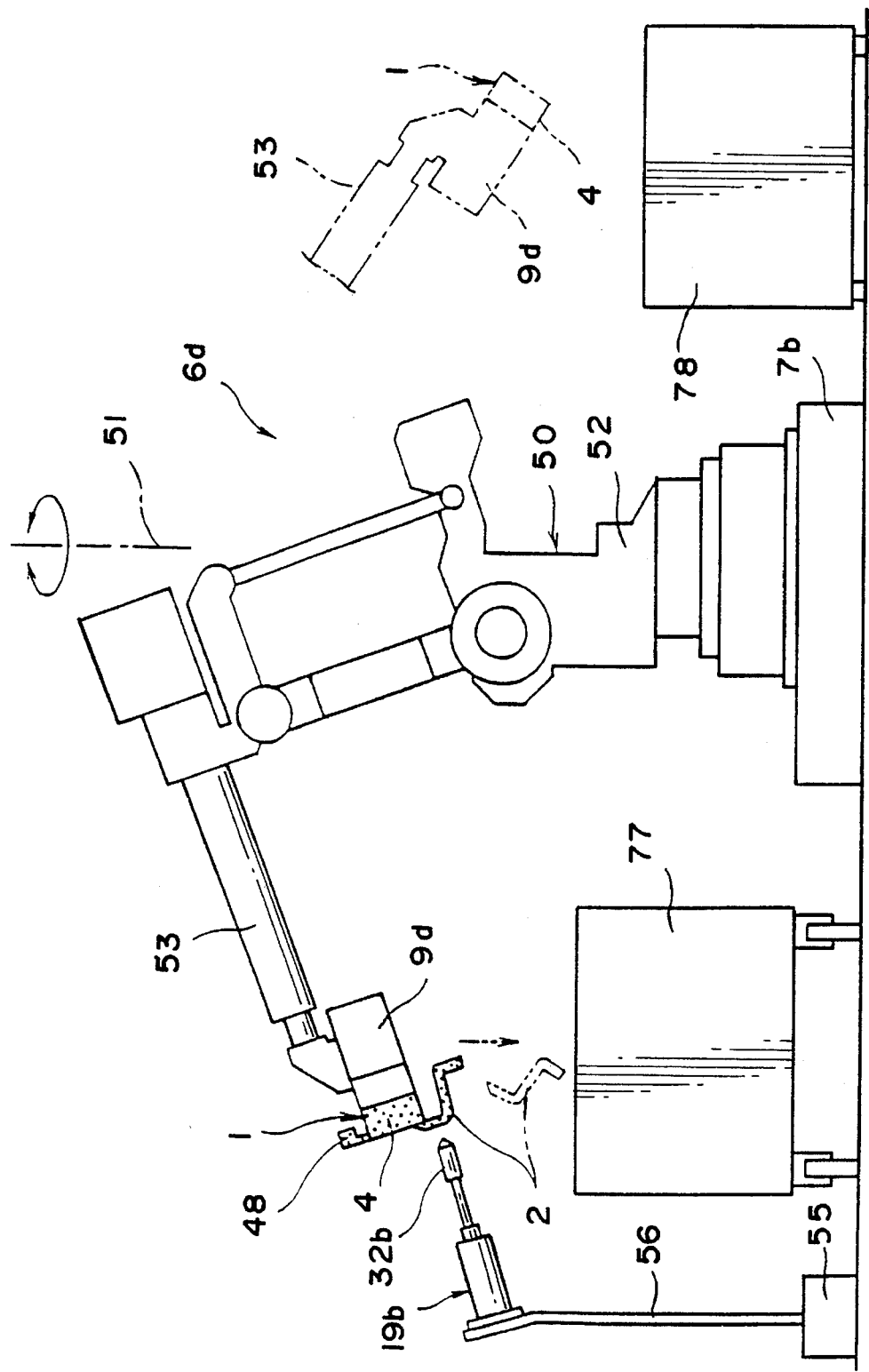
FIG. 12 is a schematic side view depicting a runner removing device, similar to that shown in FIG. 6, but incorporating a holding assembly according to a fourth embodiment.
Figure 13:
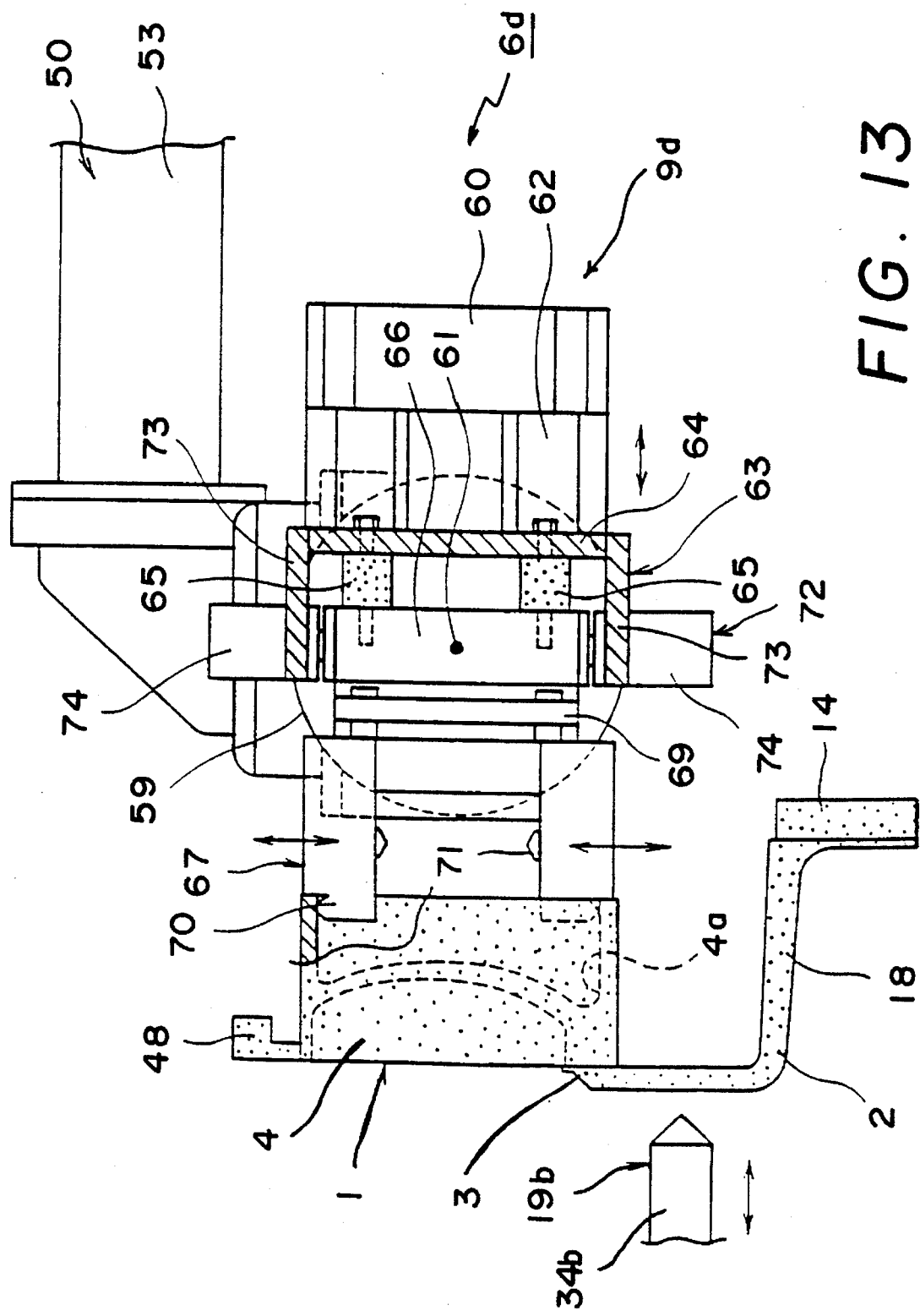
FIG. 13 is an enlarged, partial cross-sectional view of the holding assembly of FIG. 12.

Reference will now be made to FIGS. 12 and 13 in describing a holding assembly 9d according to a fourth embodiment of the present invention. In this embodiment, outside chuck teeth 70 project outwardly from hand chuck 67. The operation of hand chuck 67 causes outside chuck teeth 70 to press against the inside circumferential surface of a hole 4a formed in product portion 4 so that product portion 4 is directly supported by hand chuck 67. In addition, a return-material bucket 77 is provided to catch runner portions 2 that are removed from product portion 4. Finally, a product bucket 78 is provided within which product portion 4 can be released after rotation of robot 50. In all other respects, this embodiment operates in a manner directly analogous to the embodiments described above and since like reference numerals refer to corresponding parts in the several views, no further explanation of these elements are provided here.

Figure 14:
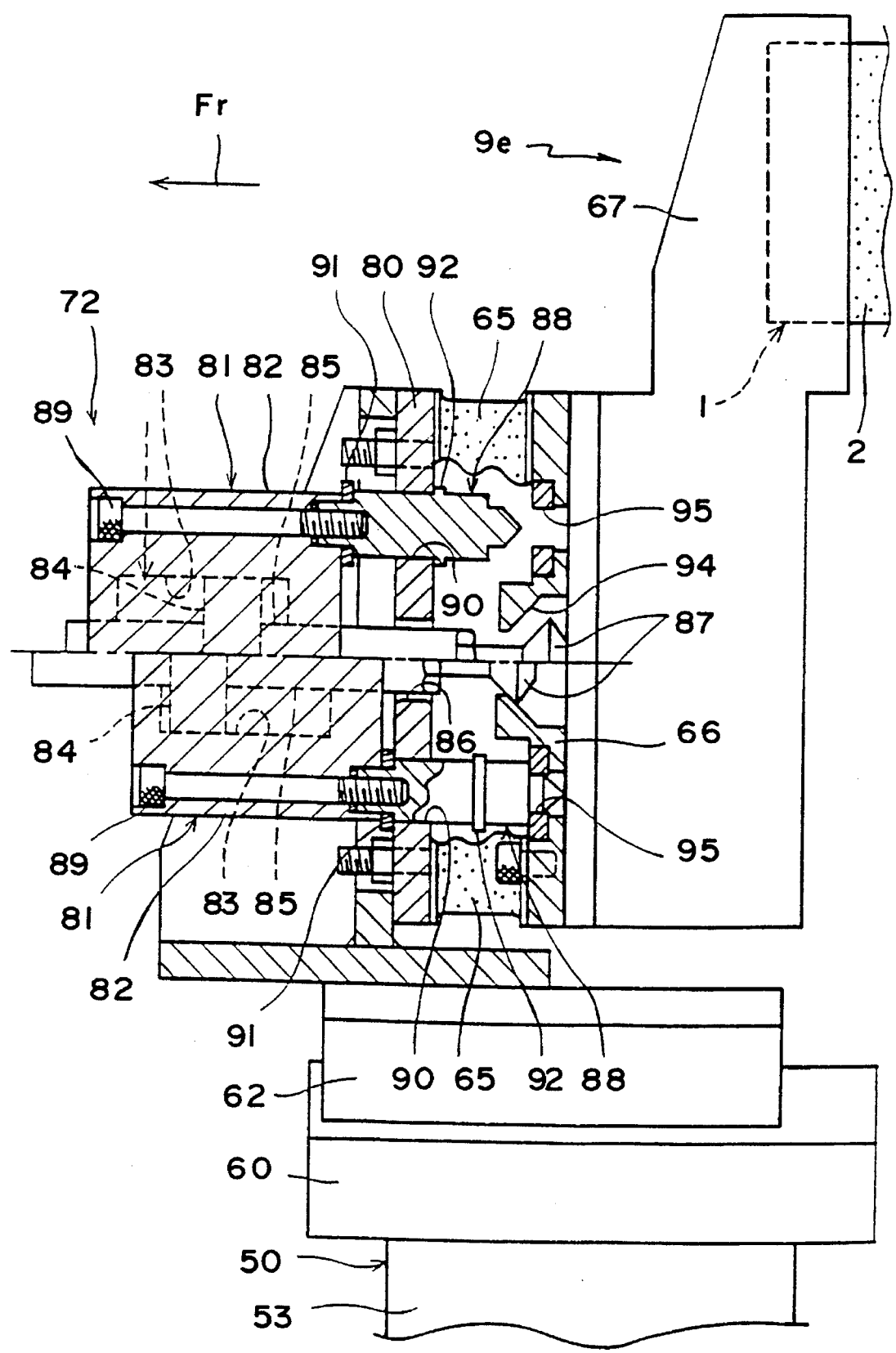
FIG. 14 is a partial, cross-sectional side view of a holding assembly according to a fifth embodiment.
Figure 15:
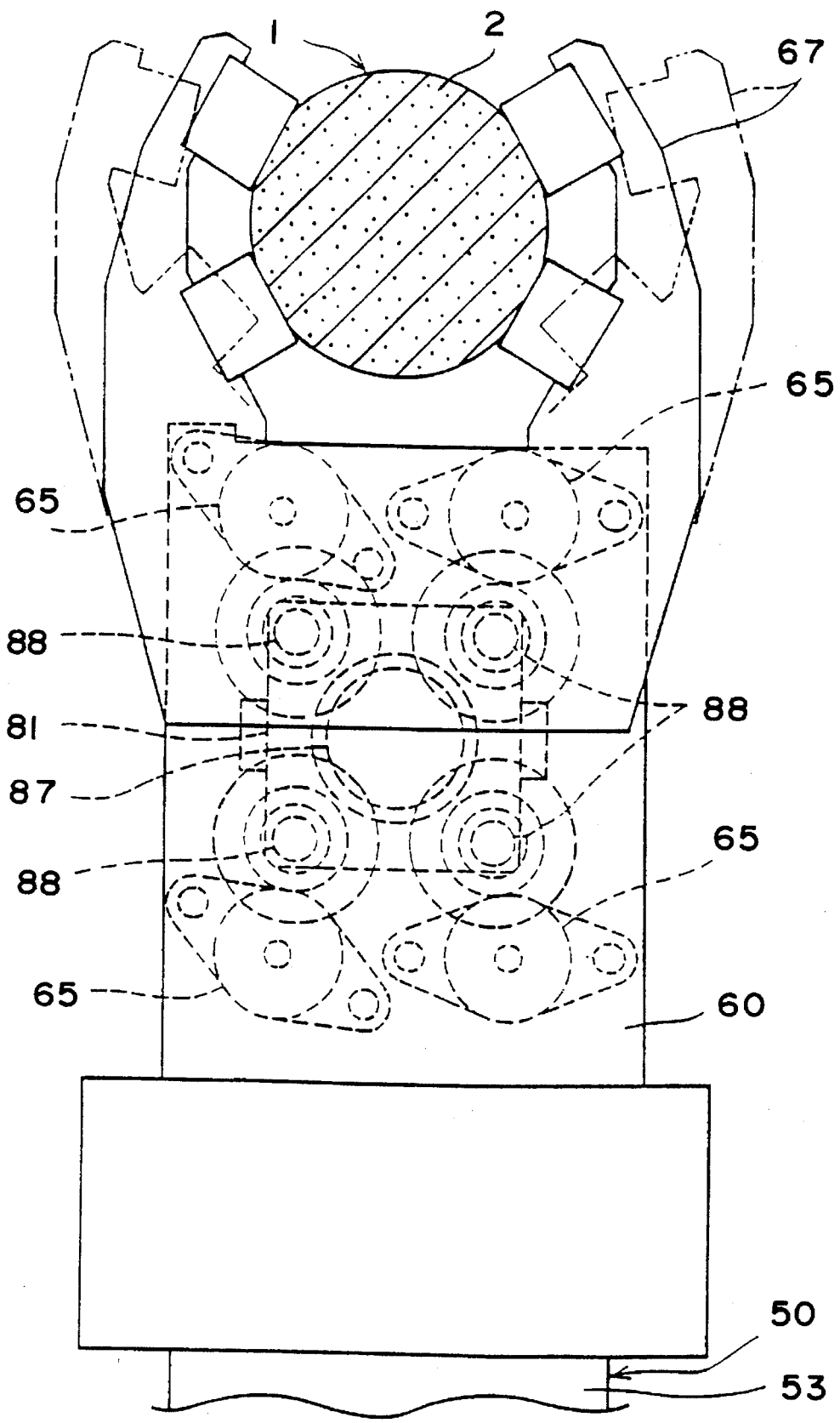
FIG. 15 is a rear view of the holding assembly shown in FIG. 14.
Figure 16:
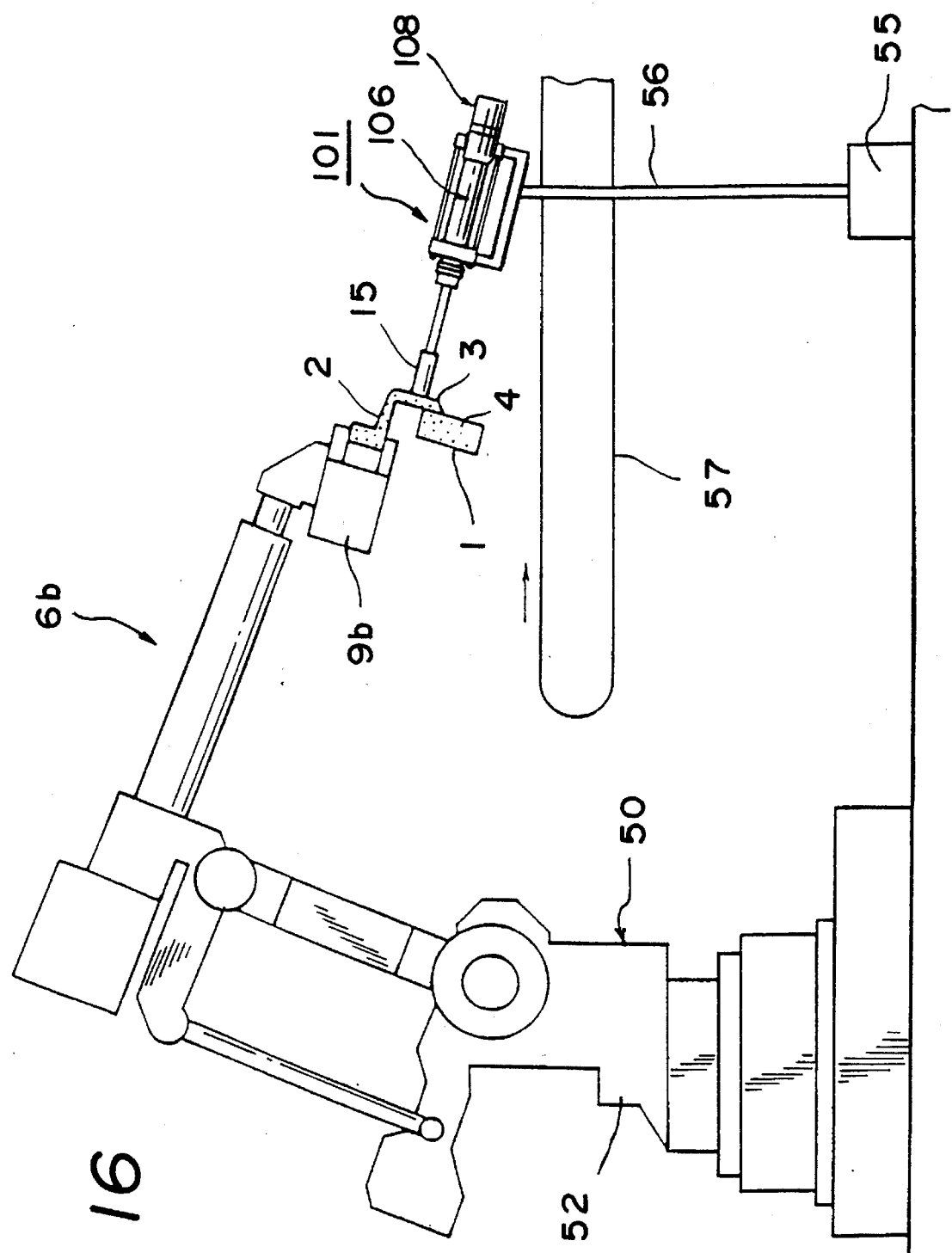
FIG. 16 is a schematic side view of a runner removing device according to a fifth embodiment of the invention.

Reference will now be made to FIGS. 14 and 15 in disclosing a still further embodiment of a holding assembly 9e according to the invention. In this embodiment, the attachment assembly 72 comprises a support table 80 mounted upon sliding table 62. Support table 80 is fitted with holding cylinders 81 which extend forward and back with respect to their axes. Each holding cylinder 81 is composed of a cylinder tube 82, inside of which there is a pressure chamber 83 which receives a piston 84 for free sliding movement in the axial direction. At the back of piston 84, there is provided a piston rod 85 that projects backward through a rear end of cylinder tube 82. The projecting ends of these piston rods 85 pass through holes 86 provided in support table 80 and conical retainers 87 are present on the projecting ends of these piston rods 85.

Extending rearward from the top and bottom and left and right rear end surfaces of cylinder tube 82 are engagement projections 88. Engagement projections 88 are held by bolts 89 to cylinder tube 82. In the preferred embodiment, engagement projections 88 evince a circular cross-section and are inserted so that they are free to slide back and forth in slide holes 90 formed in support table 80. This allows support table 80 to be held in place by holding cylinders 81. At their front and back, the outside circumferential surfaces of engagement projections 88 comprise a front stop 91 and a back stop 92. On the other hand, support table 80 is attached to bracket 66 of holding assembly 9e by shock absorbing members 65. When viewed from the front, there are four of these shock absorbing members 65 surrounding holding cylinders 81. Conically shaped engagement indents are provided for the insertion of retainers 87 into bracket 66. Engagement holes 95 are present in bracket 66 so that the projecting ends of engagement projections 88 can engage or disengage from them.

As shown above the centerline in FIG. 14, when compressed air is supplied in front of piston 84 within pressure chamber 83 of holding cylinder 81, holding cylinder 81 expands and the engagement projection 88 presses against the bottom surface of engagement depression 94 and cylinder tube 82 moves forward. As this happens, there is a corresponding forward movement of each engagement projection 88 and its projecting end is disengaged from engagement hole 95. This disengages the attachment between support assembly 9e and arm 53 of robot 50. At this time, the forward movement of cylinder tube 82 causes back stop 92 to come into contact with support table 80.

On the other hand, as shown below the center line in FIG. 14, when compressed air is supplied behind piston 84 inside of pressure chamber 83 of holding cylinder 81, holding cylinder 81 contracts. At this time, engagement projections 88 come into contact with the inside circumferential surface of engagement depression 94 and the front stop 91 moves rearward by contraction of cylinder tube 82 until it contacts support table 80. Then, the projecting end of engagement projection 88 is inserted into engagement hole 95 while also in contact with the perimeter of the opening of engagement hole 95 such that holding assembly 9e is affixed to arm 53. As the other structural and operational details of holding assembly 9e are similar to those described in the embodiments above, further explanation thereof will be omitted here.

With regard to the embodiments of the invention described in FIGS. 6–15, it should be readily recognized that the height of support pillar 56 can be varied in order to move the vibrator device up or down as desired. As a countermeasure to prevent strike marks on product portion 4, this would be an effective way to minimize the separation between product portion 4 and, for example, the conveyor belt 57 in the embodiment of FIG. 6. It is also possible to incorporate the present invention described for use if two products are connected by a single runner portion. In this arrangement, the runner portion 2 will be clamped onto the hand chuck 67 and two vibrators 32 would be positioned so strike at the requisite connection points. It would also be possible to not vibrate the hammer assembly itself but rather to move the robot arm for impact purposes. The product portion 4 could also be held by a separate clamping device to prevent dropping of the product or the hammering assembly could be perpendicularly positioned to strike the intermediate molded product horizontally so the products could be aligned with the conveyor below to reduce any impact marks from dropping of the product.

In general, it is important to note that the holding assemblies according to these embodiments when used in combination with a robot arm prevents vibrations produced by striking the product portion or the runner portion from being transmitted to the robot arm. As a result, the arrangement prevents any undue load from being put on the robot arm and any load is concentrated on the connection location between the product and runner portions, whereby speedy removal of the runner portion is enhanced. In addition, as described above, the intermediate molded product is fixedly secured to the robot arm during transporting thereof so that movement of the intermediate molded product faithfully follows the movement of the arm and thereby accurate positioning of the product to be worked on is possible.

Reference will now be made to FIGS. 16–25 in describing the construction and operation of a preferred embodiment of the vibrator device incorporated in the present invention. For illustrative purposes only, the vibrator device has been shown in FIG. 16 to be incorporated into a runner removing device including a robot 50 generally analogous to that shown and described with respect to FIG. 6. Therefore, like reference numerals have been used to refer to corresponding parts to the embodiment described above and the description of these parts will not be duplicated herein.

As shown, vibrator device 101 comprises a pneumatic cylinder 106 that receives compressed air from a compressed air supply 107, such as a compressor or the like. Compressed air supply 107 actually communicates with the rear of pneumatic cylinder 106 via an automatic switching device 108. When supplied with compressed air, pneumatic cylinder 106 operates such that a piston 110 thereof slides inside a cylinder 111. At the rear end of cylinder 111, there is a passage-defining block 112 that is adapted to close off the supply of air and, at the front end of cylinder 111, there is a pressure-sealing plug 114 which is threaded onto the front of cylinder 111 with a cushion 113 therebetween to plug the front end of cylinder 111.

Figure 18:
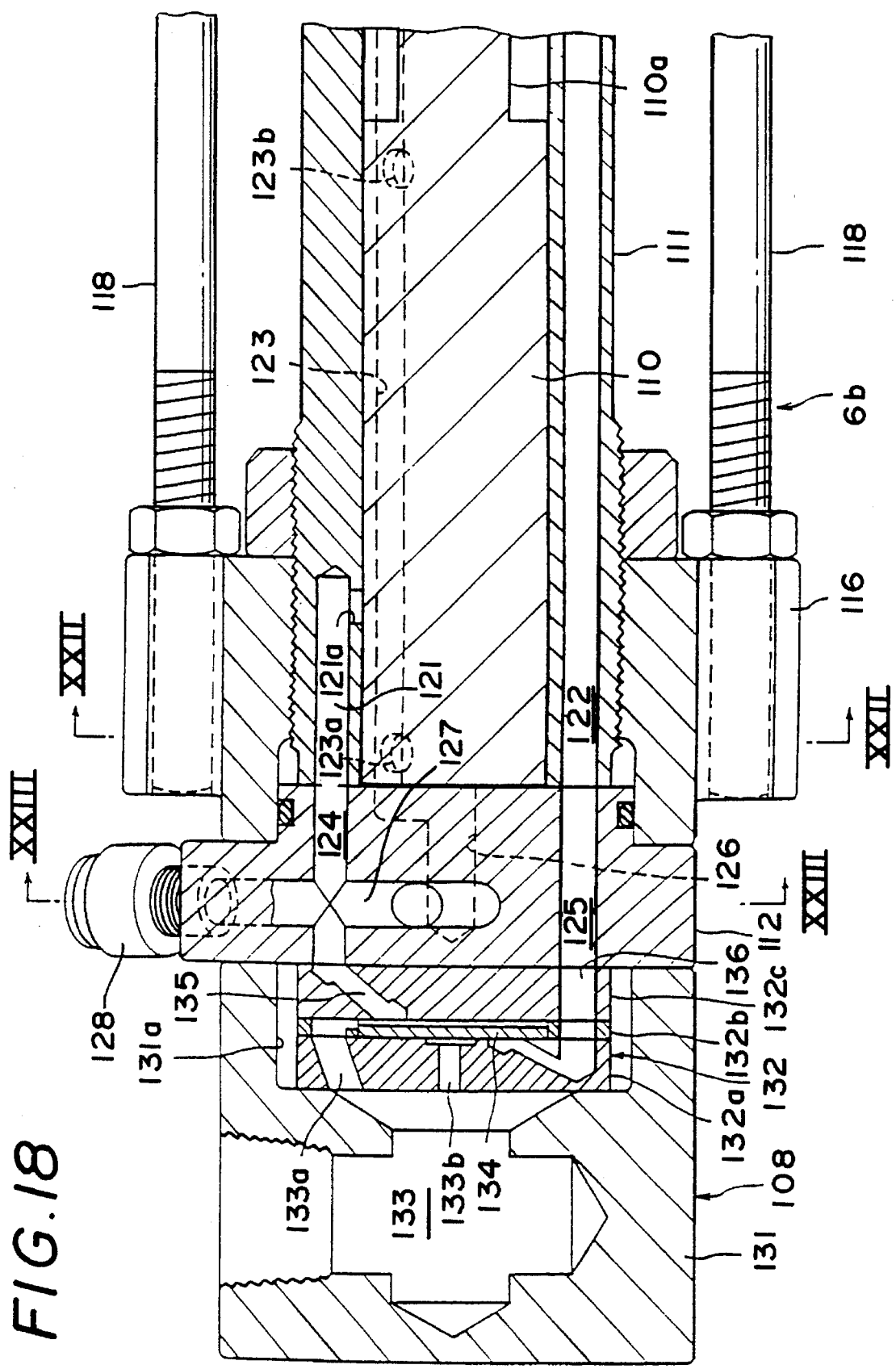
FIG. 18 is an enlarged cross-sectional rear view of the vibrator device of FIG. 17.
Figure 20:
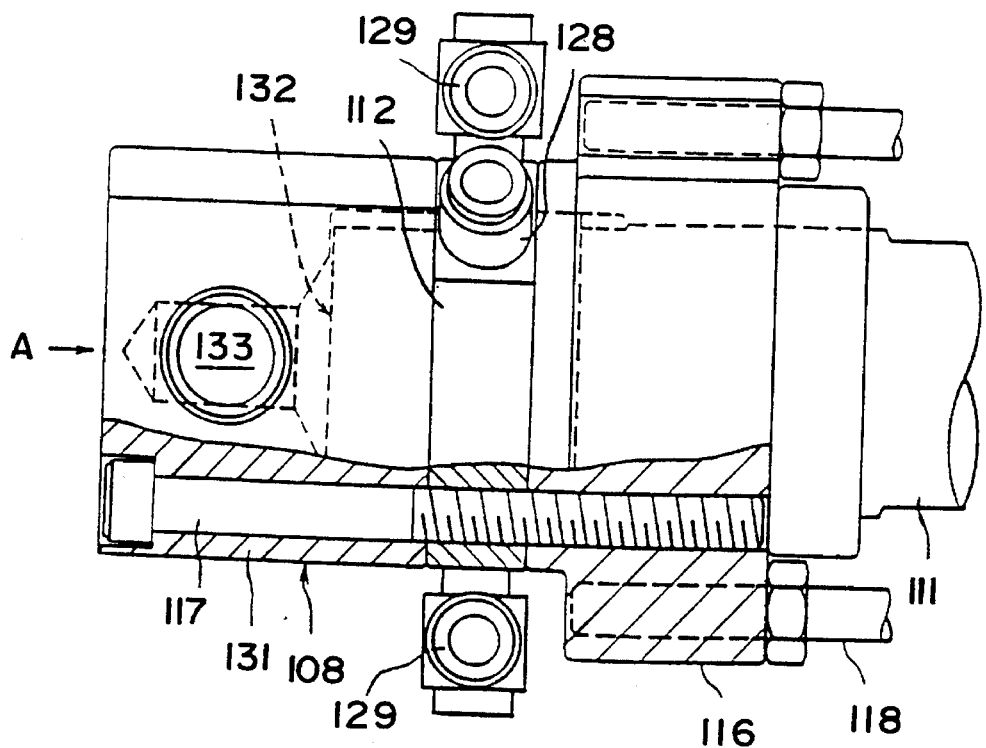
FIG. 20 is a partial, cross-sectional view of a portion of the vibrator device shown in FIG. 17.
Figure 21:
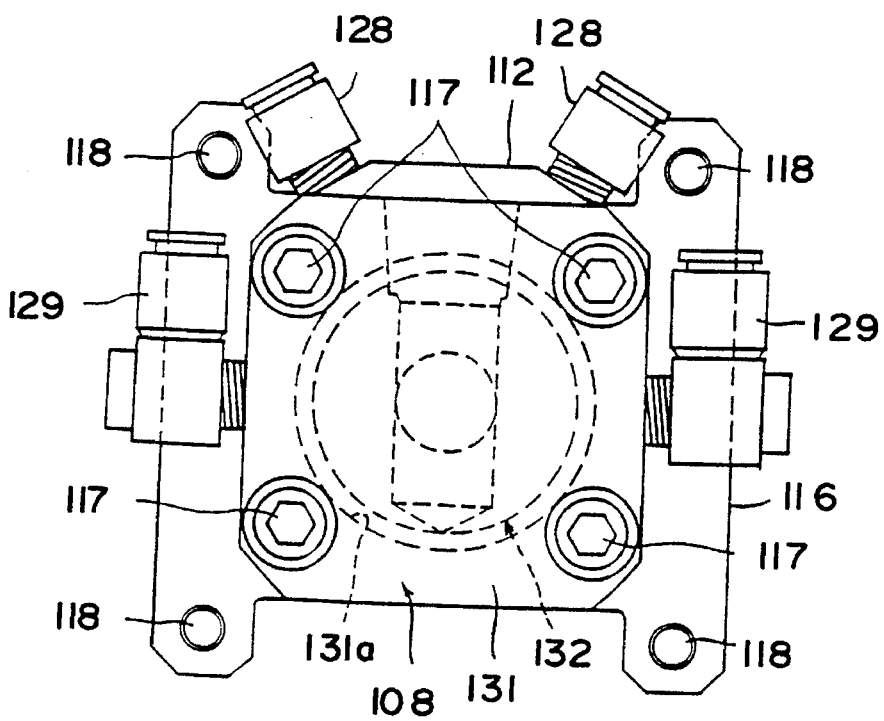
FIG. 21 is a view taken in the direction of Arrow A in FIG. 20.

Affixed to the front end of piston 110 is a piston rod 110(*a*) which projects through a hole in plug 114 so as to extend outside of cylinder 111. A hammer member 115 is attached to piston rod 110(*a*). As best shown in FIG. 18, cylinder 111 has a support flange 116 threadably secured about the outside circumference of a rear end thereof such that support flange 116 is joined to passage-defining block 112. As also shown in FIGS. 20 and 21, this junction with the passage-defining block 112 is implemented by four bolts, one of which is indicated by reference numeral 117. Bolts 117 also affix automatic switching valve device 108, which will be explained in detail below, to passage-defining block 112. Therefore, support flange 116 is attached to passage-defining block 112 and the automatic switching valve device 108 by means of bolts 117. Airtight seals (not labeled) are provided between the adjoining surfaces of these members as well.

Figure 19:
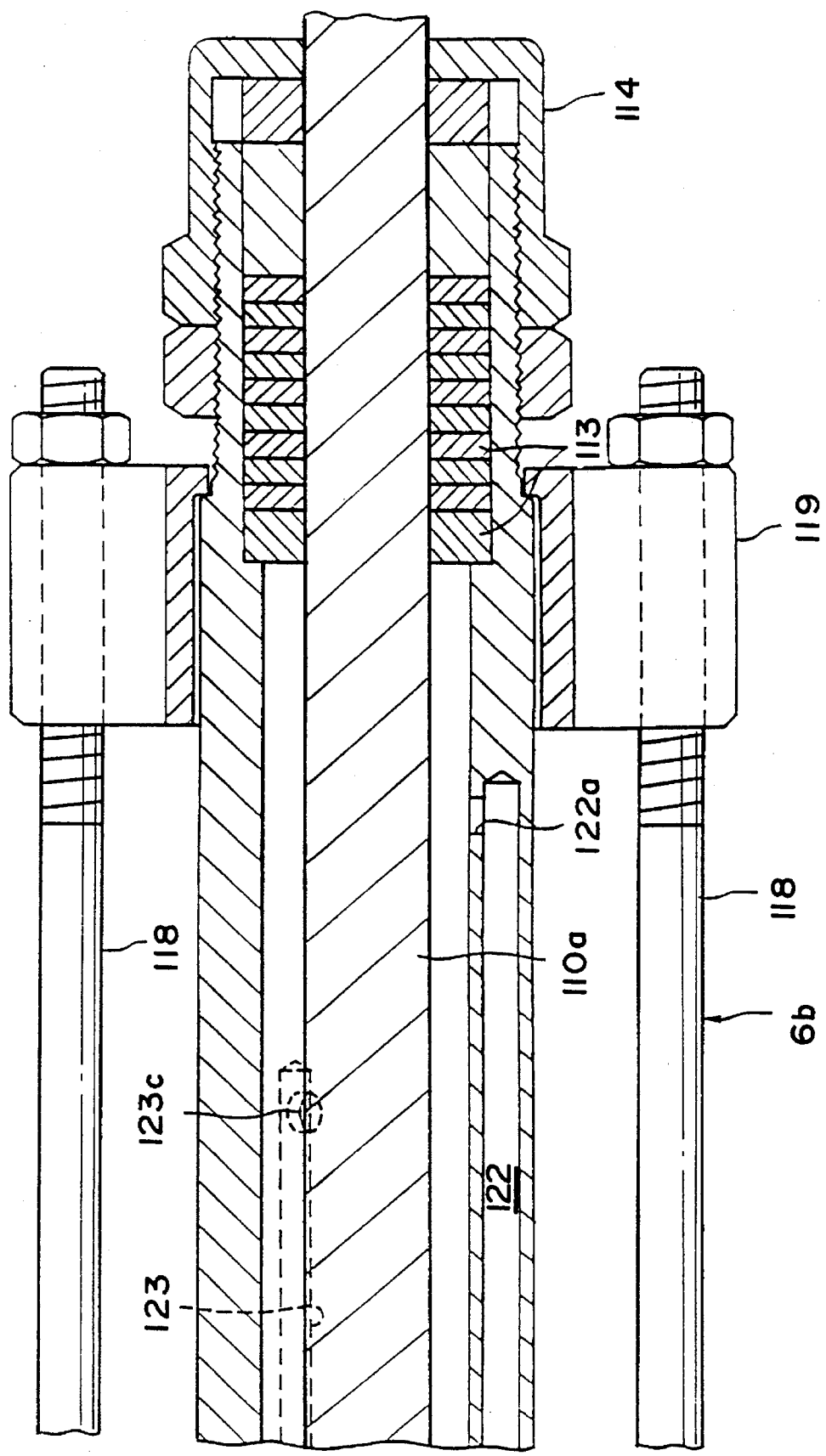
FIG. 19 is an enlarged cross-sectional front view of the vibrator device of FIG. 17.

There are four connecting rods 118 which extend forwardly from support flange 116. Connecting rods 118 are generally parallel to cylinder 111. As best shown in FIG. 19, connecting rods 118 are attached to front side flange 119 which, in turn, is attached to the front end of cylinder 111. In addition, support flange 116 and the front side flange 119 are attached to support pillar 56 by means of a bracket (not shown).

Figure 22:
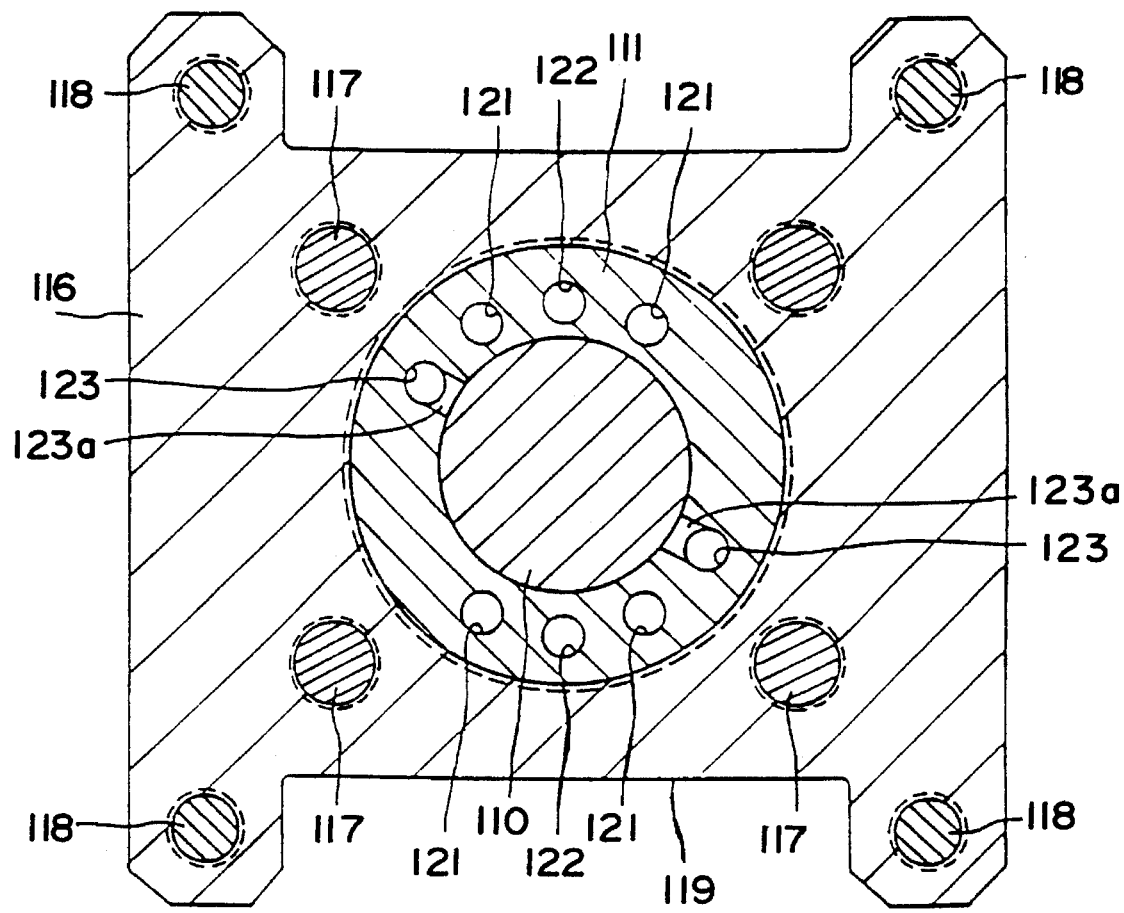
FIG. 22 is a cross-sectional view taken along line XXII—XXII of FIG. 18.

A piston-advance air hole 121 is provided in the wall of cylinder 111 through which compressed air is permitted to pass to advance piston 110. Retraction air hole 122 similarly passes compressed air to retract piston 110. Inside cylinder 111, there are exhaust holes 123 positioned in the axial direction of cylinder 111 which allow air to escape. In this embodiment, advance of piston 110 corresponds to the movement of piston 110 in the right direction as viewed in FIG. 17 and retraction thereof occurs as piston 110 moves toward the left. Advance air holes 121 are present in four places in cylinder 111 and include upstream ends that open to the rear end surface of cylinder 111 while the downstream ends, as best shown in FIG. 18, open into a port 121*a* on the rear end of the inside surface of cylinder 111. Retraction air holes 122 are present in two places, at the top and bottom of cylinder 111 between the above mentioned advance air holes 121 as best shown in FIG. 22. The retraction air holes 122 have upstream ends that open to the rear end surface of cylinder 111 while their downstream ends, as best shown in FIG. 19, open into a front-end side board 122*a* on the inside diameter surface of cylinder 111.

Figure 17:
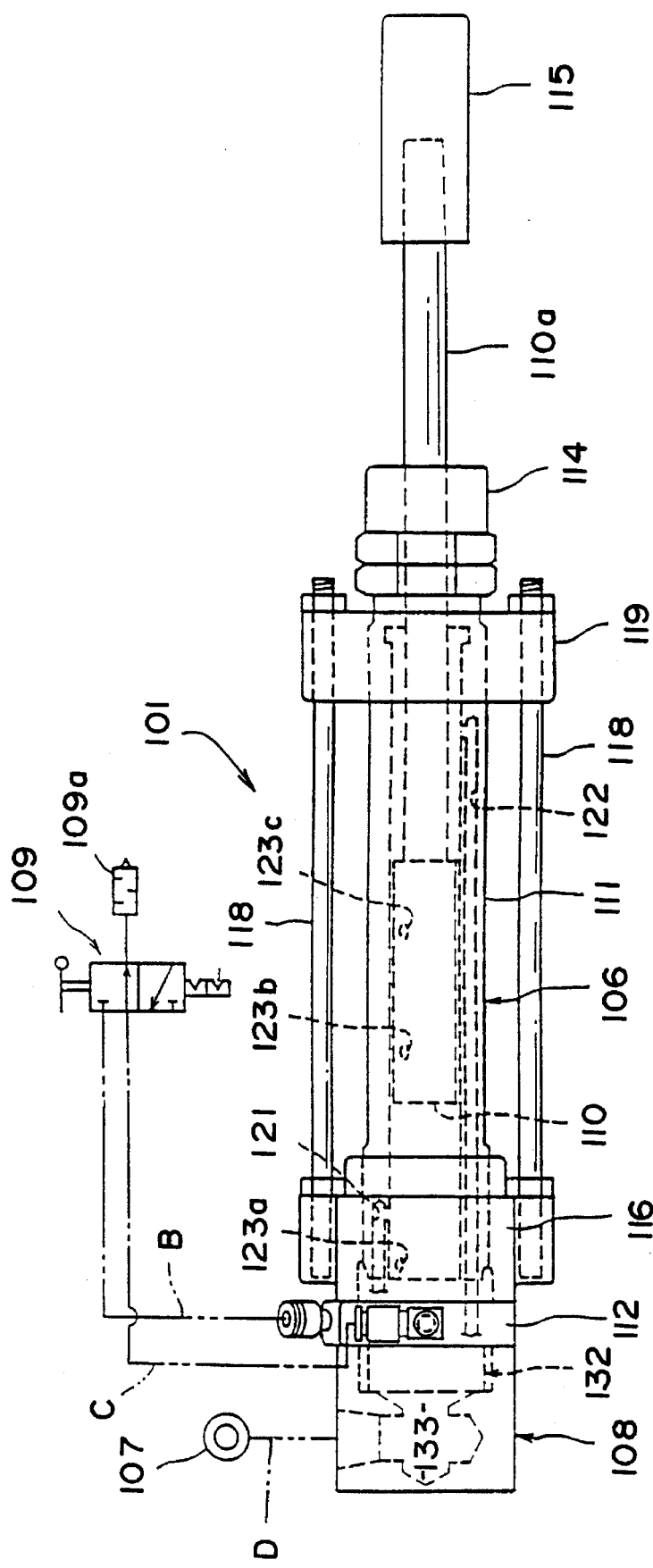
FIG. 17 is a partial, cross-sectional view of a vibrator device incorporated in the runner removing device of the invention.

Exhaust ports 123 are located between advance air holes 121 and, as shown in FIG. 22, are present on the left and right sides of cylinder 111. The respective downstream ends of these exhaust ports 123 open into the rear end surface of cylinder 111 and the other ends of which, as best shown in FIGS. 17–19 and 24 have ports 123*a*, 123*b* and 123*c* opening into the inside circumferential surface of cylinder 111. Ports 123*a*–123*c* are provided at spaced intervals as best shown in FIG. 17. Port 123*a*, which is located farthest rearward, is positioned in the area of the rear end of cylinder 111.

Figure 23:
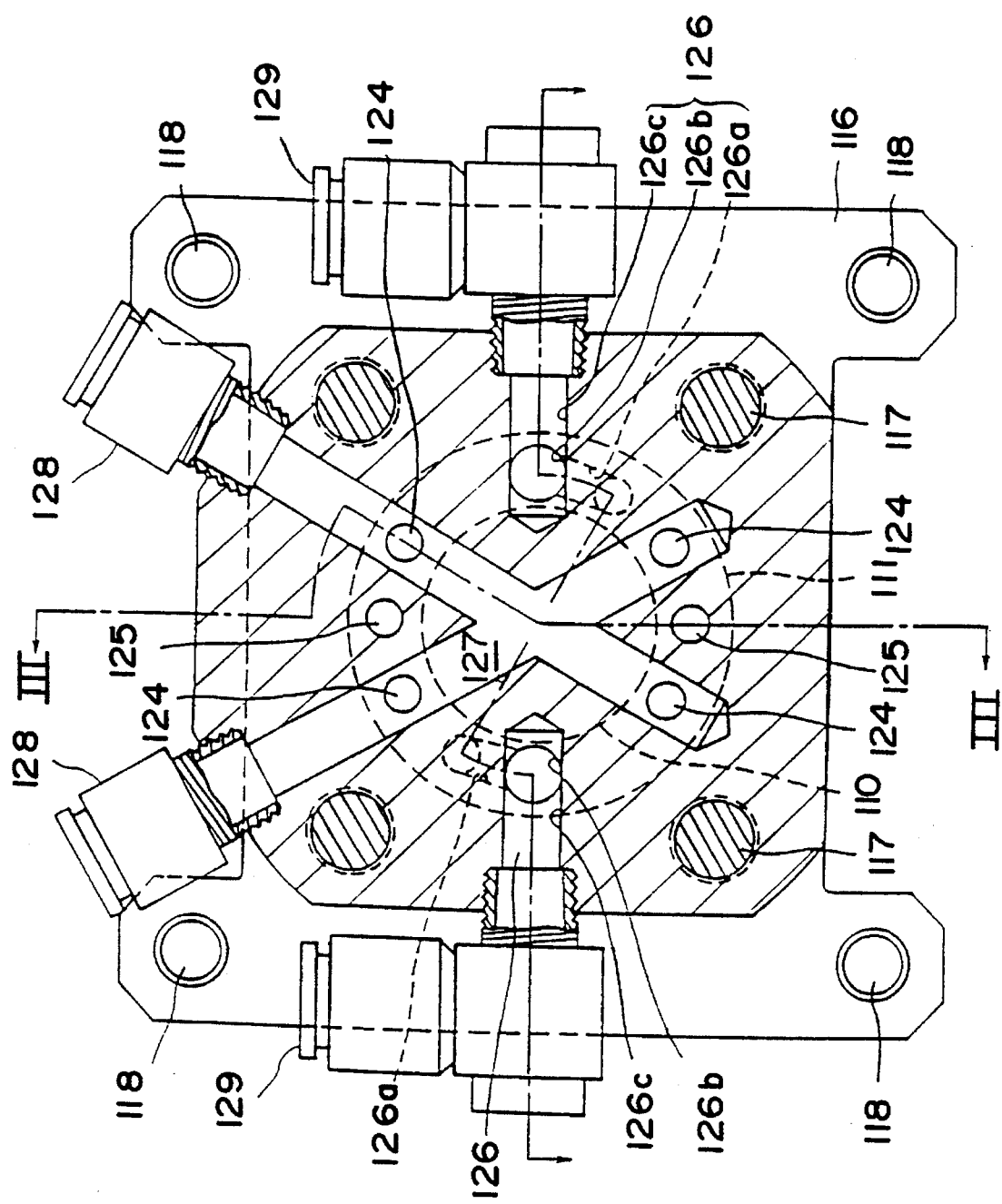
FIG. 23 is a cross-sectional view taken along line XXIII—XXIII of FIG. 18.

The above-mentioned passage-defining block 112 includes an advance air passage 124, a retraction air passage 125 and an exhaust air passage 126 placed in positions respectively corresponding to air holes 121, 122 and exhaust port 123 in cylinder 111. Advance air hole or passage 124 and retraction air hole or passage 125 pass through passage-defining block 112 substantially parallel to the axial direction of cylinder 111. As will be more fully discussed herein, advance air hole 124 and retraction air hole 125 are connected to automatic switching valve 108. Advance air hole 124 includes various paths, as best shown in FIG. 23, that are all linked together by a communication hole 127 which is generally X-shaped. Communication hole 127 opens on the top of passage-defining block 112 and a nipple 128 is threaded into it. The broken line B shown in FIG. 17 shows the connection of an air tube to nipple 128 through a three-way valve 109, as will be described more fully below.

Figure 24:
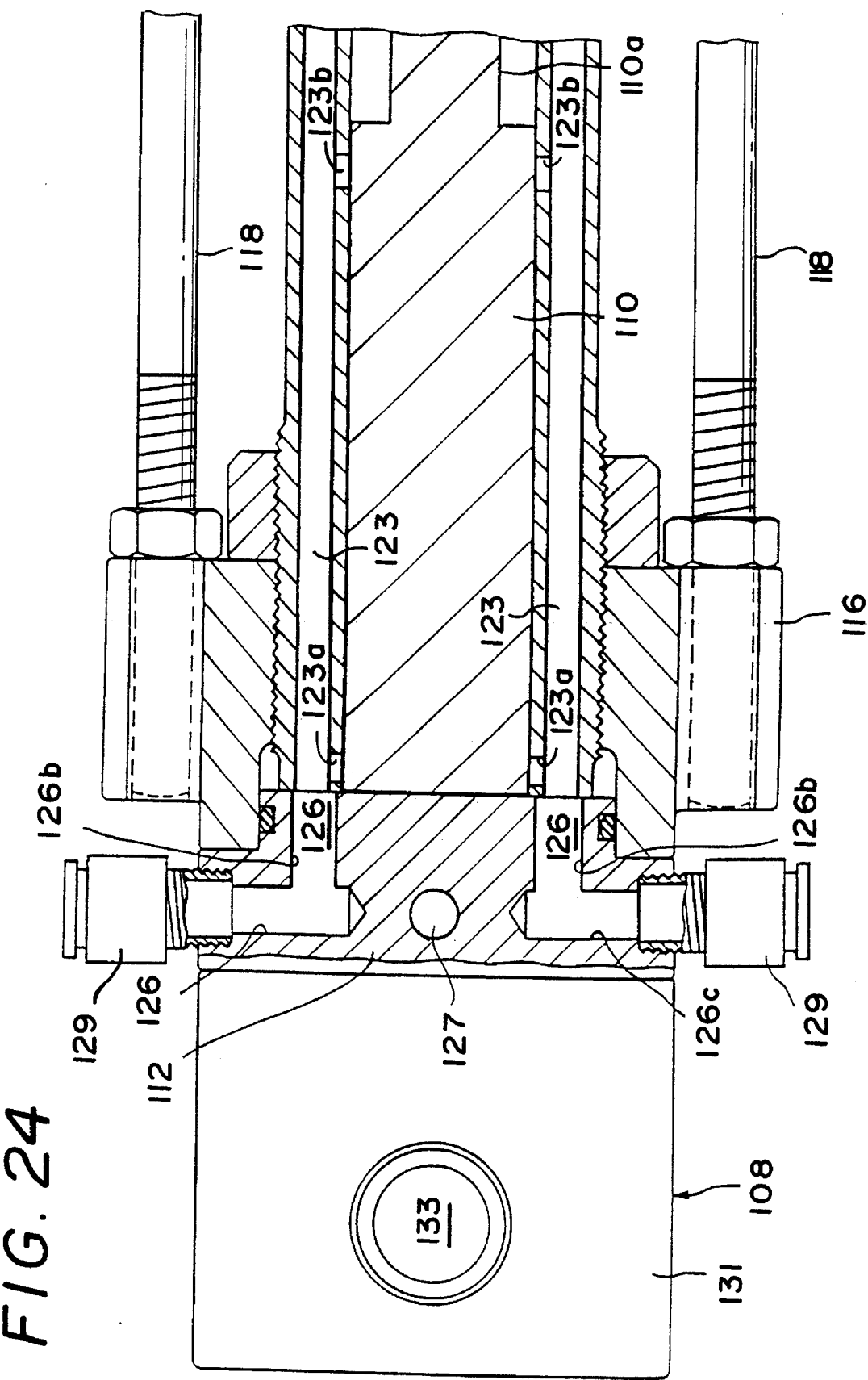
FIG. 24 is a cross-sectional view taken along line XXIV—XXIV of FIG. 23.

Exhaust hole or passage 126, as best shown in FIGS. 23 and 24, is constituted by a groove 126*a* which extends in the circumferential direction of cylinder 111 in a position opposite the opening for exhaust port 123 in cylinder 111, an axial projection 126*b* which extends in the axial direction of cylinder 111, and a radial extension 126*c* which extends in the radial direction of cylinder 111. Groove 126*a*, axial projection 126*b* and radial extension 126*c* open, as best shown in FIG. 23, on the left and right of the tube end of passage-defining block 112. Exhaust hole 126 is also connected to three-way valve 109 via nipple 129 which is threaded into it on the side of passage-defining block 112 and through the air tube shown by the broken line C in FIG. 17.

As best shown in FIGS. 21–23, automatic switching valve 108 is attached to passage-defining block 112 by means of bolts 117. Automatic switching valve 108 consists of a valve case 131 (see FIG. 18) and a valve body 132 which resides in a recess 131*a* formed in valve case 131 and which is held against passage-defining block 112 by the valve case 131. There are air passage openings or paths 133 on the top surface of valve case 131 and on the bottom of recess 131*a*. The upper opening in air passage 133 is attached to an air tube shown by the broken line D in FIG. 17 to indicate communication with the compressed air supply 107. Valve body 132 actually comprises a sack of three sheets of passage-defining materials 132*a*, 132*b* and 132*c* and a plate-shaped valve body 134, placed within these passage-defining materials 132*a*–132*c*, which can retract freely in the axial direction of cylinder 111. Valve body 132 has an advance air hole 135 and a retraction air hole 136 which respectively connect to advance air holes 124 and retraction air holes 125 in passage-defining block 112. Automatic switching of valve body 134 causes these air passages to be selectively connected to air path 133. Therefore, the space occupied by valve body 134 is configured such that even when the position of valve body 134 is either left or right as viewed in FIG. 18, air path 133 remains connected through connecting paths 133*a* or 133*b* and the upstream opening of advance air hole 135 on the cylinder side wall of adjacent passage-defining material 132*c*, as well as the upstream opening of the retraction air hole 136 on the opposite wall of the cylinder 111 at passage-defining material 132*a*, are open. Thereby, as shown in FIG. 18, when valve body 134 is positioned on the left side (the passage-defining material 132*a* side), the piston-advance air hole 135 is connected via path 133*a* to air path 133 and, in addition, the piston retraction air hole 136 is closed by valve body 134. Conversely, when valve body 134 is in the opposite position, i.e., on the right side, the piston-retraction air hole 136 is connected to air path 133 by means of connecting path 133*b* while the piston advance air hole 135 is closed by valve body 134.

Explanation will now be provided in detail of the principal behind the switching operation of the automatic switching valve 108 as well as the operation of pneumatic cylinder 106. As was described above, when the piston advance air hole 135 is connected with air path 133, and if connecting passage 127, which connects to air tube B, is in a closed condition, the compressed air supply source 107 provides compressed air through air path 133 to the piston advance air holes 135, 124 and 121 to the rear side of piston 110 inside cylinder 111. The compressed air at the rear end of piston 110 propels the piston forward. At this time, hammer member 115 advances and, if intermediate workpiece 1 is in place, body section 18 is struck. When piston 110 reaches its extended position, the pressure inside the front end of cylinder 111 is caused to rise. Since this pressure is transmitted via piston retraction air holes 122, 125, and 136 to the space occupied by valve body 108, when the advance of piston 110 has been completed, the aforementioned pressure causes valve body 134 to move to the opposite side, i.e., to the right side as viewed in FIG. 18.

When this change in the position of valve body 134 occurs, piston retraction air hole 136 will be connected to air path 133 via connecting path 133b and the compressed air supplied through air path 133 will pass through piston retraction air holes 136, 125 and 122 inside the front of cylinder 111. This means that the air pressure in front of piston 110 causes piston 110 to be driven in the opposite, rearward direction. In other words, piston 110 is retracted by air pressure delivered in front of it. When piston 110 reaches the final stage of its retraction, the compressed air inside cylinder 111 passes through piston advance air holes 121, 124 and 135 and is applied to the space occupied by valve body 134, thereby driving valve body 134. Also, when compressed air is delivered inside cylinder 111 through the piston advance air holes or the piston retraction air holes, and the air to air tube C is connected with exhaust hole 126, the amount of increase in cylinder volume caused by the movement of piston 110 is compensated by venting air to the atmosphere via exhaust holes 123, 126 and air tube C. Accordingly, valve body 134 can move in opposite directions as compressed air in air path 133 is alternately supplied to piston advance air holes 122, 125, and 136 and piston retraction air holes 121, 124 and 135. So long as compressed air is continually supplied to air path 133, piston 110 and hammer member 115 will continue to reciprocate.

The above mentioned three-way valve 109 is preferably a manual valve which selectively connects air tube B or air tube C to atmosphere. There is also provided a muffler 109a attached at the opening to the outside atmosphere. Therefore, by this construction, it should be readily recognized that when air tube C is open to atmosphere, air tube B is closed and vice-versa.

Figure 25A:
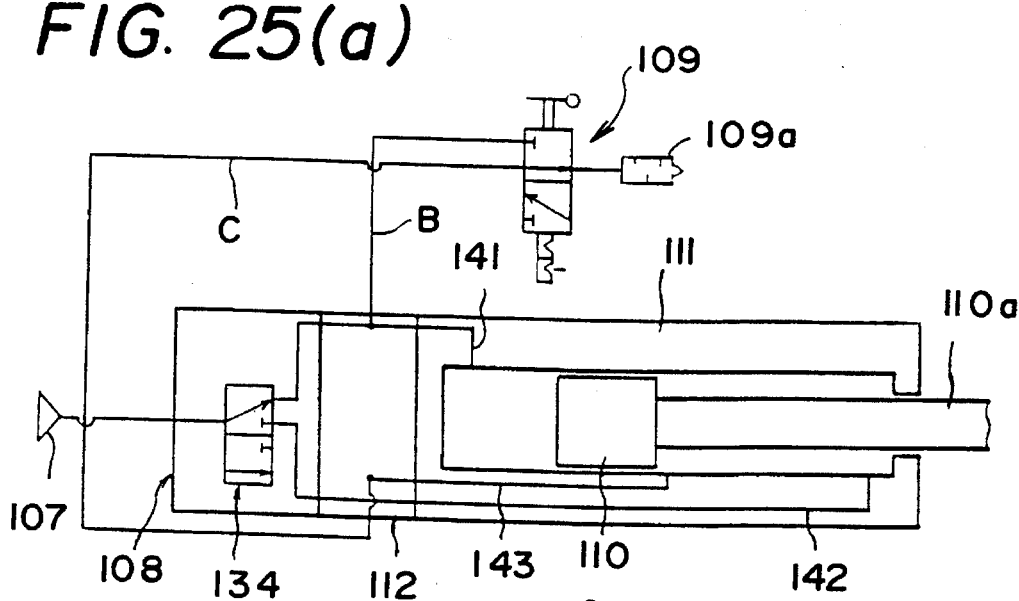

The operation of vibrator device 101 will now be described with reference to FIGS. 25(a)–(c). In these figures, the piston advancing air path comprises the piston advance air holes 135, 124 and 121 which are collectively referred to as reference number 141; the piston retracting air path comprises piston retraction air holes 136, 125 and 122 which is indicated collectively as reference numeral 142; and the exhaust air path comprising exhaust holes 123 and 126 is indicated by reference number 143.

First, the relative position between intermediate work product 1 and vibrator device 101 is set such that vibrator device 101 will strike at gate 3. The relative distance between gate 3 and vibrator device 101 is set such that the strike position is slightly short of the full stroke length of cylinder 111. Initially, hammer member 115 is located in its fully retracted position. Also, as shown in FIG. 25(a), three-way valve 109 is set to vent air from air tube C to the atmosphere and to close air tube B. In this condition, compressed air is supplied to automatic switching valve 108.

Next, compressed air flows through piston advancing air path 141 due to the operation of automatic switching valve 108. Since it is receiving compressed air supplied from compressed air supply source 107, piston 110 advances from the position shown in FIG. 25(a). At the final stage of advancement, hammer member 115 strikes intermediate work product 1. Part of the compressed air supplied to cylinder 111, namely that portion corresponding to the increase in cylinder volume, moves through exhaust passage 143 and air tube C to three-way valve 109 and muffler 109(a) wherein it is vented to atmosphere. On the other hand, when piston 110 has advanced fully forward, automatic switching valve 108 alters the flow path of the compressed air so that after the hammer strike, the air flows through the piston retracting air path 142.

Figure 25B:
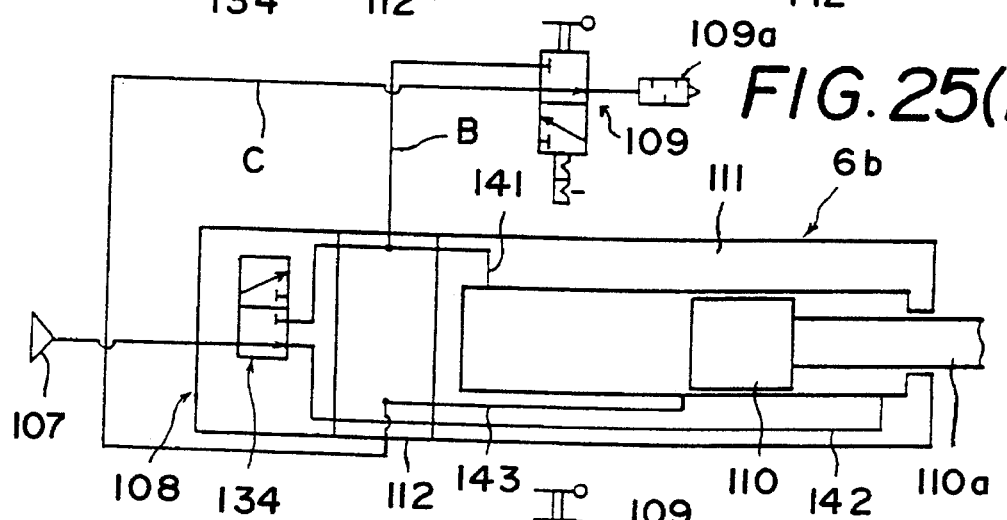
Figure 25C:
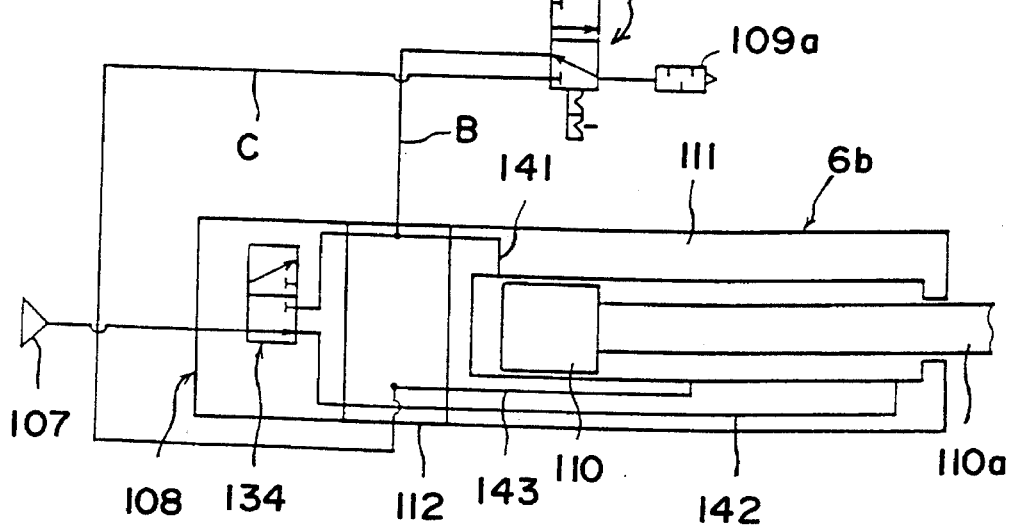

The post hammer strike condition is shown in FIG. 25(b). After the strike, the pressure of the compressed air begins to drive piston 110 rearward. Piston 110 retracts until it reaches the fully retracted position, at which point, automatic switching valve 108 once again causes the compressed air to flow through the piston advancing air path 141. This causes piston 110 to again advance such that hammer 115 again strikes the intermediate work product 1. This repeated striking of intermediate work product 1 causes product portion 4, just below gate 3, to vibrate and eventually separate from runner portion 2 as fully described above.

After product portion 4 has been released, the operation of three-way valve 109 causes vibrator device 101 to halt operations. By switching of three-way valve 109, compressed air supply 107 supplies compressed air to automatic switching valve 108 as shown in FIG. 25(c) and air tube B is vented to the atmosphere while air tube C is closed. By switching the three-way valve 109 in this manner, the piston advancing air path 141 is vented to the atmosphere while the exhaust air path 143 is closed.

If the above-described operation stopping action takes place during the piston advancing process, piston 110 will decelerate while moving to the front of cylinder 111. Since the position of valve body 134 of automatic switching valve 108 switches from the position shown in FIG. 25(a) to that shown in FIG. 25(b), the piston retracting air path 142 is connected to the compressed air and piston 110 retracts. At this time, compressed air inside cylinder 111 is vented from the piston advancing air path 141 through air tube B to the atmosphere. As a result, there is no pressure supplied from piston advancing air path 14 1 to the automatic switching valve 108 so that when piston 110 reaches its fully retracted position, there is no switching of valve body 134 back to the position shown in FIG. 25(a). In other words, piston 110 retracts and stops at the rear end of cylinder 111. If the whole thing takes place while piston 110 is retracted, piston 110 stops at the back of cylinder 111 as well.

Thus, after piston 110 has been stopped in the manner described above, since exhaust air path 143 is closed, pressure will remain inside cylinder 111 and piston 110 will be held in this position by the air pressure. Accordingly, when the striking operation has been completed, pressure in front of piston 110 causes it to retract, thereby bringing hammer member 115 to its fully rearward position. Therefore, hammer member 115 will not stop midway in any neutral position.

By carefully managing the flow of compressed air as set forth above to retract hammer member 115 fully, the weight of vibrator device 101 of the present invention can be decreased since there is no need to have an auxiliary cylinder to retract the hammer member. Consequently, support stand 56 and pillar 55 can be made smaller and lighter and need not be engineered to withstand high fatigue loadings. In particular, this weight minimizing feature is particularly advantageous over arrangements wherein a hammer member retracting cylinder is positioned at the front end of the vibrator device which necessitates the use of a massive of support for the vibrator device.

Although vibrator device 101 disclosed with reference to FIGS. 16–25 represents a preferred embodiment, it should be recognized that hammer member 115 can also be stopped in its full forward position by connecting three-way valve 109 to the piston retracting air path 142 instead of the piston advancing air path 141 as shown in FIG. 25. Also, it is not absolutely necessary to utilize the exact connection of the exhaust path 143 to the three-way valve 109 as described above since similar effects can be achieved by always venting to atmosphere. That is, either the piston advancing air path 141 or the piston retracting air path 142 may be vented to atmosphere via a valve (not shown). It should simply be recognized that the vibrator device according to the present invention is structured such that when either the piston advancing air path or the piston retracting air path are vented to atmosphere, the piston and hammer member can be set in either the fully forward or fully rearward position by the action of compressed air at the back or front of the piston when vibration operations are halted. Therefore, when hammering operations are completed, the hammer member 115 will not remain in a neutral position between the fully forward or full backward positions. This assures stability in the resumption of operations. Hence, by the present invention, halting the hammering operation takes place smoothly and with a high degree of efficiency. Moreover, this air flow control arrangement renders unnecessary the need for an auxiliary pneumatic cylinder to properly position the hammer member following operation of the vibrator device.

Although described with respect to preferred embodiments of the invention, it should readily understood that various changes and/or modifications can be made to the present invention without departing from the spirit thereof. In general, the invention is only intended to be limited by the scope of the following claims.

We claim:

1. A device for removing runner portions that are joined to product portions of an intermediate molded product by a gate zone comprising:

means for holding one of the runner and product portions in a fixed position;

a hammer member;

means for vibrating said hammer member between a fully retracted position proximate a portion of said means for vibrating and a fully extended position distal said portion of said means for vibrating to cause repeated striking of said intermediate product by the hammer member when said hammer member is in its extended position for separating the runner and product portions at the gate zone, said vibrating means including a cylinder, a piston slidably received within the cylinder so as to define two variable volume chambers within the cylinder, and a piston rod having a first end secured to the piston and a second end extending out of said cylinder, said hammer member being fixedly secured to the second end of said piston rod; and control means for activating and deactivating said vibrating means, said control means positioning said hammer member in one of said fully retracted and fully extended positions upon deactivation of said vibrating means, said control means including an automatic switching valve for sequentially controlling compressed fluid flow to said two variable volume chambers and an atmospheric release valve for opening one of said to variable volume chambers to atmosphere upon deactivation of said vibrating means, said atmospheric release valve comprising a three-way valve that is in fluid communication with each of said two variable volume chambers and with an exhaust passage which passes from inside said cylinder to outside of said cylinder, said control means functioning to open said exhaust passage to atmosphere when said vibrating means is activated and to close said exhaust passage to prevent communication with atmosphere when said vibrating means is deactivated.

2. A device as claimed in claim 1, wherein said holding means engages the runner portion such that the product portion is supported in a cantilevered manner.

3. A device as claimed in claim 1, further including means for adjusting the position of said vibrating means relative to the gate zone.

4. A device as claimed in claim 3, wherein said adjusting means permits the position of said vibrating means to be altered in at least two dimensions.

5. A device as claimed in claim 1, wherein said hammer member includes a resilient portion remote from said piston rod whereby the resilient portion strikes said intermediate product in said fully extended position.

6. A device as claimed in claim 1, wherein said hammer member includes an internal channel having an open end within which said piston rod is slidably received.

7. A device as claimed in claim 1, wherein said holding means includes a selectively positionable robot arm and a holding assembly carried by said robot arm.

8. A device as claimed in claim 7, wherein said holding assembly is resiliently attached to the remote end of said robot arm.

9. A device as claimed in claim 8, wherein said holding assembly is removably attached to said robot arm.

10. A device as claimed in claim 7, further including first and second means for attaching said holding assembly to said robot arm, said first attaching means comprising a resilient connection between said holding assembly and a remote end of said robot arm and said second attaching means comprising at least one holding unit adapted to selectively, fixedly interconnect or disconnect said holding assembly and said robot arm.

11. A device as claimed in claim 7, further including first and second means for attaching said holding assembly to said robot arm, said first attaching means comprising a resilient connection between said holding assembly and a remote end of said robot arm and said second attaching means comprising a linear actuator adapted to selectively, fixedly interconnect or disconnect said holding assembly and said robot arm.

12. A device as claimed in claim 1, wherein said automatic switching valve is fluidly connected to one of said two variable volume chambers through a first fluid pathway and said atmospheric release valve is fluidly connected to said first fluid pathway through a first fluid tube such that said atmospheric release valve is fluidly connected to said one of said two variable volume chambers through said first fluid pathway and said first fluid tube.

* * * * *